(12) United States Patent
Bhagwan

(10) Patent No.: US 11,394,215 B1
(45) Date of Patent: Jul. 19, 2022

(54) QUICK RELEASE AND CONNECT SYSTEM THAT PROVIDES BATTERY POWER FOR A WEARABLE ELECTRONIC DEVICE AND METHOD FOR REDUCING BATTERY CHARGING DOWN TIME OF A WEARABLE ELECTRONIC DEVICE

(71) Applicant: Raghunand Bhagwan, Sunnyvale, CA (US)

(72) Inventor: Raghunand Bhagwan, Sunnyvale, CA (US)

( * ) Notice: Subject to any disclaimer, the term of this patent is extended or adjusted under 35 U.S.C. 154(b) by 0 days.

(21) Appl. No.: 17/308,804

(22) Filed: May 5, 2021

Related U.S. Application Data

(60) Provisional application No. 63/055,188, filed on Jul. 22, 2020.

(51) Int. Cl.
| | | |
|---|---|---|
| *H02J 7/00* | (2006.01) | |
| *G04G 19/10* | (2006.01) | |
| *G06F 1/26* | (2006.01) | |
| *G06F 1/3212* | (2019.01) | |
| *G06F 1/16* | (2006.01) | |
| *G02C 11/00* | (2006.01) | |

(52) U.S. Cl.
CPC ............ *H02J 7/0042* (2013.01); *G02C 11/10* (2013.01); *G04G 19/10* (2013.01); *G06F 1/163* (2013.01); *G06F 1/263* (2013.01); *G06F 1/3212* (2013.01); *H02J 7/0013* (2013.01); *H02J 7/0048* (2020.01); *H02J 7/0063* (2013.01)

(58) Field of Classification Search
CPC ...... H02J 7/0042; H02J 7/0063; H02J 7/0048; H02J 7/0013; G02C 11/10; G06F 1/163; G06F 1/263; G06F 1/3212; G04G 19/10

USPC ............................................ 320/101; 713/324
See application file for complete search history.

(56) References Cited

U.S. PATENT DOCUMENTS

| | | | | |
|---|---|---|---|---|
| 6,767,218 | B2 * | 7/2004 | Marmaropoulos | ......................... H01R 13/6271 280/801.1 |
| 9,436,009 | B1 * | 9/2016 | Bhardwaj | ............. G06F 1/1656 |
| 9,591,913 | B2 * | 3/2017 | Kim | ...................... H02J 7/342 |
| 9,965,859 | B2 * | 5/2018 | Kim | ........................ G06T 7/248 |
| 10,020,668 | B2 * | 7/2018 | Adamisin | ............... H02J 50/10 |
| 10,118,037 | B2 * | 11/2018 | Kaula | ..................... G16Z 99/00 |
| 10,191,289 | B2 * | 1/2019 | Bhardwaj | .......... G02B 27/0176 |
| 10,517,182 | B2 * | 12/2019 | Seo | ...................... A61B 5/4806 |
| 10,534,184 | B2 * | 1/2020 | Gupta | .................. G09B 21/008 |
| 10,840,536 | B2 * | 11/2020 | Rogers | ............. H01M 10/0525 |
| 10,863,060 | B2 * | 12/2020 | Kokonaski | ............. H02J 7/342 |

(Continued)

FOREIGN PATENT DOCUMENTS

| | | | | |
|---|---|---|---|---|
| CN | 108701950 | A | * 10/2018 | ............ H01M 50/20 |
| KR | 20150057122 | A | * 5/2015 | ............. G06F 1/163 |

(Continued)

*Primary Examiner* — M Baye Diao

(57) ABSTRACT

A quick release and connect system that provides battery power for a wearable electronic device and a method for reducing battery charging down time of a wearable electronic device are disclosed. The quick release and connect system that provides battery power for a wearable electronic device and the method for reducing battery charging down time of a wearable electronic device reduces battery charging down time of a wearable electronic device by swapping of attachable-detachable auxiliary components with auxiliary batteries.

10 Claims, 14 Drawing Sheets

(56) References Cited

U.S. PATENT DOCUMENTS

| | | | | |
|---|---|---|---|---|
| 2002/0148078 | A1* | 10/2002 | Salentine | A45F 5/004 |
| | | | | 24/115 F |
| 2013/0021226 | A1* | 1/2013 | Bell | G02B 3/0006 |
| | | | | 345/8 |
| 2014/0337621 | A1* | 11/2014 | Nakhimov | H04W 12/068 |
| | | | | 713/168 |
| 2016/0163036 | A1* | 6/2016 | Kim | G06V 40/23 |
| | | | | 382/107 |
| 2016/0373870 | A1* | 12/2016 | Kang | H04R 1/1025 |
| 2017/0242805 | A1* | 8/2017 | Nietner | G06F 13/102 |
| 2018/0180893 | A1* | 6/2018 | Gupta | G02B 27/0176 |
| 2020/0278718 | A1* | 9/2020 | Steinmark | A41D 1/005 |

FOREIGN PATENT DOCUMENTS

| | | | | | |
|---|---|---|---|---|---|
| KR | 20150118979 A | * | 10/2015 | | G02B 6/023 |
| TW | 201710751 A | * | 3/2017 | | G02C 11/10 |

* cited by examiner

QUICK RELEASE AND CONNECT SYSTEM THAT PROVIDES BATTERY POWER FOR A WEARABLE ELECTRONIC DEVICE AND METHOD FOR REDUCING BATTERY CHARGING DOWN TIME OF A WEARABLE ELECTRONIC DEVICE

CLAIM OF BENEFIT TO PRIOR APPLICATION

This application claims benefit to U.S. Provisional Patent Application 63/055,188, entitled "Method and apparatus to reduce charging time for wearable electronic devices," filed Jul. 22, 2020. The U.S. Provisional Patent Application 63/055,188 is incorporated herein by reference.

BACKGROUND

Embodiments of the invention described in this specification relate generally to battery technology, and more particularly, to a quick release and connect system that provides battery power for a wearable electronic device and a method for reducing battery charging down time of a wearable electronic device by swapping of attachable/detachable auxiliary components with auxiliary batteries and automatically delivering power from the auxiliary batteries.

Wearable electronics like smart watches, health trackers, fitness trackers, smart glasses and such suffer from down time when their batteries have to be recharged. Charging batteries of wearable devices takes time. For example, a popular state of the art smart watch available currently might need 30-60 minutes to fully charge. While recharging the batteries, the device is not worn and is not performing its intended functions. Accordingly, a user cannot benefit from the intended functions of the wearable device when battery charging is happening. For example, a user with a wearable device benefits from the intended functions offered by the device, such as a health tracker that monitors the user's heart rate or a smart watch that tracks the number of steps that user takes throughout the day.

Swapping batteries of other electronics is fairly common and only takes a few seconds (e.g., 15-30 seconds, more or less). For example, users routinely swap batteries of cameras, remote controls, etc., which allows drained/low batteries to be charged while the other (swapped in) batteries power the device. However, the batteries of many wearable devices are embedded within the device and not easily swapped.

Therefore, what is needed is a way to reduce the down time of wearable devices with batteries that are in need of charging.

BRIEF DESCRIPTION

A novel quick release and connect system that provides battery power for a wearable electronic device and a novel method for reducing battery charging down time of a wearable electronic device is disclosed. In some embodiments, the quick release and connect system that provides battery power for a wearable electronic device and the method for reducing battery charging down time of a wearable electronic device reduces battery charging down time of a wearable electronic device by swapping of attachable/detachable auxiliary components with auxiliary batteries.

In some embodiments, the quick release and connect system that provides battery power for a wearable electronic device comprises a device head of the wearable electronic device, an onboard rechargeable battery embedded within the device head of the wearable electronic device, a plurality of auxiliary components that attach to and detach from the device head of the wearable electronic device, a plurality of auxiliary batteries that are embedded within the plurality of auxiliary components, and a plurality of electro-mechanical connectors that (i) mechanically connect the plurality of auxiliary components to the device head of the wearable electronic device and (ii) provide an electric channel between the plurality of auxiliary batteries embedded within the plurality of auxiliary components and the onboard rechargeable battery embedded within the device head of the wearable electronic device, wherein electric current flows through the electric channel from the plurality of auxiliary batteries embedded within the plurality of auxiliary components to the onboard rechargeable battery embedded within the device head.

In some embodiments, the method for reducing battery charging down time of a wearable electronic device reduces battery charging down time of a wearable electronic device by (i) detecting power level states of a main battery of the wearable electronic device and auxiliary batteries provided in connection with auxiliary components of the wearable electronic device, (ii) providing alert notifications to replace depleted auxiliary batteries with fully charged auxiliary batteries when the detected power level state of the auxiliary batteries is beneath a threshold power level state, and (iii) automatically transferring charge to the main battery from the auxiliary batteries according to the detected power level states.

In some embodiments, the quick release and connect system reduces battery charging down time of a wearable electronic smart watch with auxiliary watch bands that include auxiliary batteries. In some embodiments, the quick release and connect system reduces battery charging down time of wearable electronic smart glasses with auxiliary temples that include auxiliary batteries.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
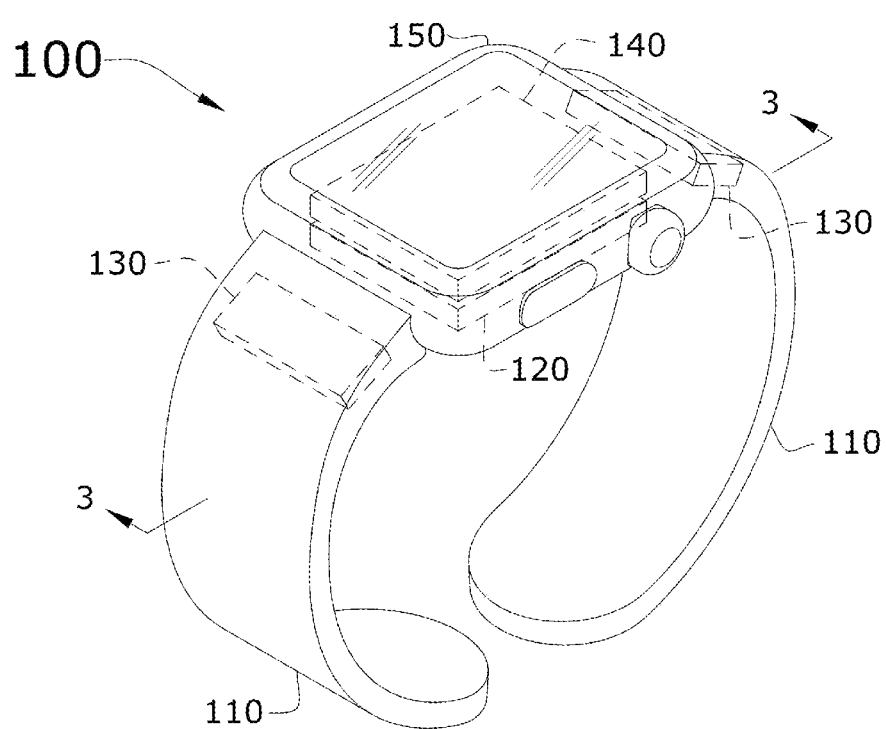
FIG. 1 conceptually illustrates a perspective view of a quick attachable-detachable watch band that reduces charge time for a wearable electronic smart watch in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a quick release and connect system that provides battery power for a wearable electronic device and a method for reducing battery charging down time of a wearable electronic device. In some embodiments, the quick release and connect system that provides battery power for a wearable electronic device and the method for reducing battery charging down time of a wearable electronic device reduces battery charging down time of a wearable electronic device by swapping of attachable/detachable auxiliary components with auxiliary batteries.

In some embodiments, the quick release and connect system that provides battery power for a wearable electronic device comprises a device head of the wearable electronic device, an onboard rechargeable battery embedded within the device head of the wearable electronic device, a plurality of auxiliary components that attach to and detach from the device head of the wearable electronic device, a plurality of auxiliary batteries that are embedded within the plurality of auxiliary components, and a plurality of electro-mechanical connectors that (i) mechanically connect the plurality of auxiliary components to the device head of the wearable electronic device and (ii) provide an electric channel between the plurality of auxiliary batteries embedded within the plurality of auxiliary components and the onboard rechargeable battery embedded within the device head of the wearable electronic device, wherein electric current flows through the electric channel from the plurality of auxiliary batteries embedded within the plurality of auxiliary components to the onboard rechargeable battery embedded within the device head.

In some embodiments, the method for reducing battery charging down time of a wearable electronic device reduces battery charging down time of a wearable electronic device by (i) detecting power level states of a main battery of the wearable electronic device and auxiliary batteries provided in connection with auxiliary components of the wearable electronic device, (ii) providing alert notifications to replace depleted auxiliary batteries with fully charged auxiliary batteries when the detected power level state of the auxiliary batteries is beneath a threshold power level state, and (iii) automatically transferring charge to the main battery from the auxiliary batteries according to the detected power level states.

In some embodiments, the quick release and connect system reduces battery charging down time of a wearable electronic smart watch with auxiliary watch bands that include auxiliary batteries. In some embodiments, the quick release and connect system reduces battery charging down time of wearable electronic smart glasses with auxiliary temples that include auxiliary batteries.

As stated above, wearable electronics like smart watches, health trackers, fitness trackers, smart glasses and such suffer from down time when their batteries have to be recharged. Charging batteries of wearable devices takes time. For example, a popular state of the art smart watch available currently might need 30-60 minutes to fully charge. While recharging the batteries, the device is not worn and is not performing its intended functions. Accordingly, a user cannot benefit from the intended functions of the wearable device when battery charging is happening. For example, a user with a wearable device benefits from the intended functions offered by the device, such as a health tracker that monitors the user's heart rate or a smart watch that tracks the number of steps that user takes throughout the day. Swapping batteries of other electronics is fairly common and only takes a few seconds (e.g., 15-30 seconds, more or less). For example, users routinely swap batteries of cameras, remote controls, etc., which allows drained/low batteries to be charged while the other (swapped in) batteries power the device. However, original equipment manufacturers (OEMs) typically embed and/or encapsulate the onboard batteries of wearable devices in ways that are challenging to access and typically very difficult to swap in or out.

Since the batteries which power the devices are generally contained within the device heads or otherwise encapsulated in some body or component of the device, recharging the batteries results in a loss of device usage for a significant amount of time. The state of the art in battery capacity to power the device is around a day to about a week, depending on the functionality of the device. During the recharge time the device is potentially not performing all its desirable functions. Such functions could be tracking activity, tracking heart rate, tracking blood oxygen levels, computing calories burnt and showing various notifications or other information. If the electronic devices are not performing their function while charging, the user who relies on the devices to monitor or use such functions might have to put their lives/schedules on hold. For example, if user is counting heart rate and calories, they might be inclined to postpone activities like exercise for the duration of recharge Nevertheless, smart wearable electronic devices often have auxiliary components such as watch bands for smart watches, temples for smart glasses, etc. In some embodiments, the auxiliary components of smart wearable electronic devices are designed to be detachable and re-attachable. In some embodiments, auxiliary batteries are incorporated into quick attachable-detachable auxiliary components of a corresponding smart wearable electronic device.

By way of example, FIG. 1 conceptually illustrates a perspective view of a quick attachable-detachable watch band that reduces charge time for a wearable electronic smart watch 100. As shown in this figure, the quick attachable-detachable watch band that reduces charge time for a wearable electronic smart watch 100 includes several components, namely, a plurality of auxiliary quick release smart watch bands 110, a smart watch case battery 120, a plurality of auxiliary smart watch band batteries 130, a smart watch battery interface and controller 140, and a main interface component 150 of the wearable electronic smart watch 100. The main interface component 150 is designed to be the device head which houses the onboard electronics of the wearable electronic smart watch 100, namely, the smart watch case battery 120 and the smart watch battery interface and controller 140. In some embodiments, the plurality of auxiliary quick release smart watch bands 110 comprises two auxiliary quick release smart watch bands 110. The two auxiliary quick release smart watch bands 110 are attachable to and detachable from the device head of the wearable electronic smart watch 100 along opposing sides of the main interface component 150. In some embodiments, the plurality of auxiliary smart watch band batteries 130 comprises two auxiliary smart watch band batteries 130. The two auxiliary smart watch band batteries 130 are embedded within the two auxiliary quick release smart watch bands 110, one auxiliary smart watch band battery 130 per auxiliary quick release smart watch band 110. In some embodiments, the plurality of auxiliary smart watch band batteries 130 comprises a first plurality of auxiliary smart watch band batteries 130 and a second plurality of auxiliary smart watch band batteries 130. In some embodiments, the first plurality of auxiliary smart watch band batteries 130 is embedded within a first of the two auxiliary quick release smart watch bands 110 and the second plurality of auxiliary smart watch band batteries 130 is embedded within a second of the two auxiliary quick release smart watch bands 110.

For this wearable electronic smart watch 100, the plurality of auxiliary quick release smart watch bands 110 are designed to be quickly detachable from and attachable to the main interface component 150 of the wearable electronic smart watch 100. In this figure, the plurality of auxiliary smart watch band batteries 130 are shown as being incorporated into the plurality of auxiliary quick release smart watch bands 110—one auxiliary smart watch band battery 130 in each auxiliary quick release smart watch band 110. While only a single auxiliary smart watch band battery 130 is shown in this figure as encapsulated within an auxiliary quick release smart watch band 110, in some embodiments, a plurality of auxiliary smart watch band batteries 130 are embedded within each of the auxiliary quick release smart watch bands 110. When the battery in the smart watch case battery 120 and the plurality of auxiliary smart watch band batteries 130 are low or depleted for the wearable electronic smart watch 100, the plurality of auxiliary quick release smart watch bands 110 with drained auxiliary smart watch band batteries 130 can be swapped for different auxiliary quick release smart watch bands 110 with fully charged auxiliary smart watch band batteries 130.

Figure 2:
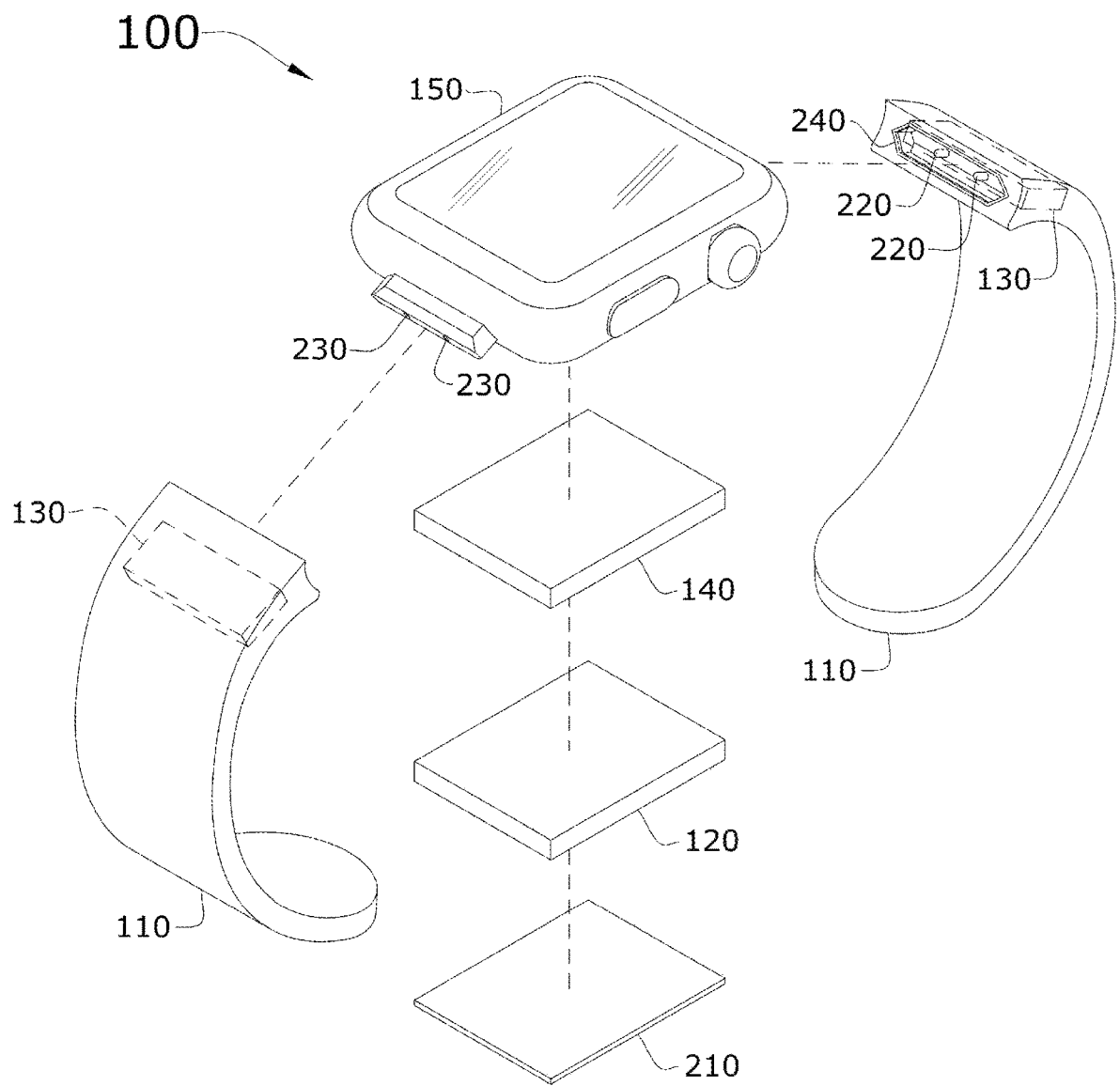
FIG. 2 conceptually illustrates an exploded view of a quick attachable-detachable watch band that reduces charge time for a wearable electronic smart watch in some embodiments.

Turning to another view, FIG. 2 conceptually illustrates an exploded view of the quick attachable-detachable watch band that reduces charge time for the wearable electronic smart watch 100. As shown in this figure, the quick attachable-detachable watch band that reduces charge time for a wearable electronic smart watch 100 includes the plurality of auxiliary quick release smart watch bands 110, the smart watch case battery 120, the plurality of auxiliary smart watch band batteries 130, the smart watch battery interface and controller 140, and the main interface component 150. Also, this exploded view of the quick attachable-detachable watch band that reduces charge time for the wearable electronic smart watch 100 reveals additional components, including a smart watch back cover 210, male connectors 220, female socket pin-outs 230, and a gasket hood 240.

As shown, the smart watch back cover 210 provides an underside panel to encapsulate the smart watch case battery 120 and the smart watch battery interface and controller 140 within the device head as the default embedded components within the main interface component 150 of the wearable electronic smart watch 100. Also, the plurality of auxiliary quick release smart watch bands 110 are shown as being detached from the main interface component 150 of the wearable electronic smart watch 100. In this detached state, the plurality of auxiliary smart watch band batteries 130 remain embedded within the plurality of auxiliary quick release smart watch bands 110.

The gasket hood 240 shown in this figure is one of two gasket hoods 240. Each gasket hood 240 is disposed at a connecting end of an auxiliary quick release smart watch band 110. The male connectors 220 extend out of the connecting end of each auxiliary quick release smart watch band 110 within the gasket hood 240. Together, the male connectors 220 and the gasket hood 240 form a male plug that connects to the female socket pin-outs 230. Thus, when the auxiliary quick release smart watch bands 110 are detached, the plurality of auxiliary smart watch band batteries 130 within the plurality of auxiliary quick release smart watch bands 110 can be charged. Then, after charging the plurality of auxiliary smart watch band batteries 130, the plurality of auxiliary quick release smart watch bands 110 can be re-attached to the main interface component 150 of the wearable electronic smart watch 100 to provide battery power to the wearable electronic smart watch 100.

Electrical power distribution from the plurality of auxiliary smart watch band batteries 130 is accomplished, in part, by way of the male connectors 220 fitting into the female socket pin-outs 230, with the gasket hood 240 securing the fit. Specifically, the gasket hood 240 slides over the female socket in a way that aligns the male connectors 220 to the female socket pin-outs 230. Since the female socket and female socket pin-outs 230 are present on both connecting sides of the main interface component 150 of the wearable electronic smart watch 100, the male connectors 220 and the gasket hood 240 act as a male plug for each auxiliary quick release smart watch band 110 connecting to the main interface component 150 of the wearable electronic smart watch 100. Then, when the auxiliary quick release smart watch bands 110 are attached to opposing sides of the main interface component 150, the power from the charged auxiliary smart watch band batteries 130 is provided to the smart watch battery interface and controller 140, which is encapsulated within the device head and embedded within the main interface component 150 of the wearable electronic smart watch 100.

Figure 3:
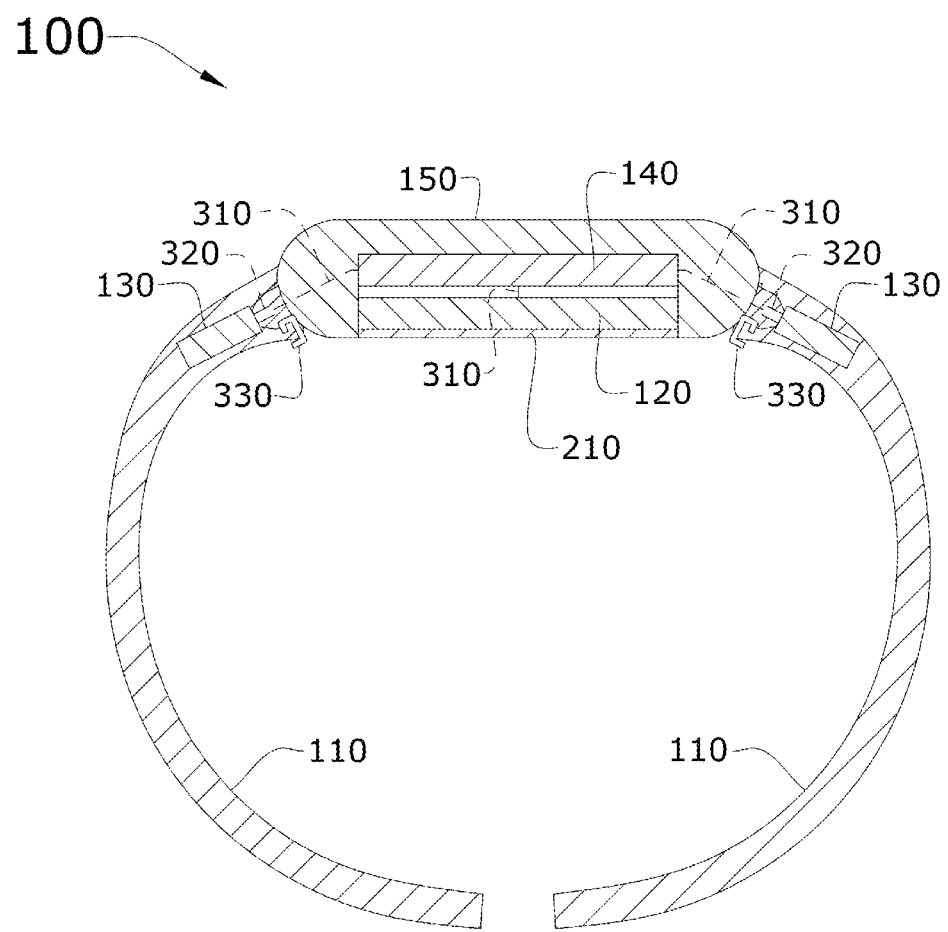
FIG. 3 conceptually illustrates a section view of the quick attachable-detachable watch band that reduces charge time for the wearable electronic smart watch shown in FIGS. 1 and 2, with the section view being taken along line 3-3 in FIG. 1.

Referring now to another example, FIG. 3 conceptually illustrates a section view of the quick attachable-detachable watch band that reduces charge time for the wearable electronic smart watch 100 shown in FIGS. 1 and 2, with the section view being taken along line 3-3 in FIG. 1. In this figure, the quick attachable-detachable watch band that reduces charge time for the wearable electronic smart watch 100 includes the plurality of auxiliary quick release smart watch bands 110, the smart watch case battery 120, the plurality of auxiliary smart watch band batteries 130, the smart watch battery interface and controller 140, the main interface component 150, and the back cover 210. Also, this section view of the quick attachable-detachable watch band that reduces charge time for the wearable electronic smart watch 100 reveals additional components, including electrical wires 310, composite electro-mechanical connectors 320, and a quick release mechanism 330.

While the quick attachable-detachable watch band that reduces charge time for the wearable electronic smart watch 100 described above, by reference to FIG. 1, presented several embedded components, namely, the smart watch case battery 120, the plurality of auxiliary smart watch band batteries 130, and the smart watch battery interface and controller 140, the section view shown in this figure demonstrates other embedded components that enable the quick attachable-detachable watch band that reduces charge time for the wearable electronic smart watch 100 to work for the purpose of providing a way to quickly swap auxiliary components and batteries in order to reduce a user's down time in using a battery-powered smart wearable device.

Specifically, the electrical wires 310 are shown as providing electrical connection between the smart watch battery interface and controller 140 and each of the battery power sources, namely, the smart watch case battery 120 and the plurality of auxiliary smart watch band batteries 130. While the smart watch case battery 120 includes a default battery of the wearable electronic smart watch 100 and is, therefore, wired to the smart watch battery interface and controller 140 in any manner deemed suitable by design and as produced by the OEM of the wearable electronic smart watch 100, the plurality of auxiliary smart watch band batteries 130 connect the electrical wires 310 to the smart watch battery interface and controller 140 by way of composite electro-mechanical connectors 320. In some embodiments, the composite electro-mechanical connectors 320 provide electrical power from the plurality of auxiliary smart watch band batteries 130 to the smart watch battery interface and controller 140 through the electrical wires 310 when the plurality of auxiliary quick release smart watch bands 110 are attached to opposing sides of the main interface component 150 of the wearable electronic smart watch 100. In this attached state, the male connectors 220 are plugged into the female socket pin-outs 230 with the gasket hood 240 sealing the connection.

While the quick attachable-detachable watch band that reduces charge time for a wearable electronic smart watch 100 described above, by reference to FIGS. 1-3, included a plurality of auxiliary quick release smart watch bands 110 and a plurality of auxiliary smart watch band batteries 130 (one auxiliary smart watch band battery 130 for each of the auxiliary quick release smart watch bands 110), other configurations of the quick attachable-detachable watch band that reduces charge time for a wearable electronic smart watch 100 are possible. In some embodiments, the quick attachable-detachable watch band that reduces charge time for a wearable electronic smart watch 100 is equipped with a single auxiliary quick release smart watch band that connects to the main interface component of the wearable electronic smart watch 100. In this configuration, the single auxiliary quick release smart watch band is attachable to and detachable from only one side of the main interface component of the wearable electronic smart watch 100 while an integrated watch band that is not detachable is connected to an opposing side of the main interface component of the wearable electronic smart watch 100. Furthermore, in some embodiments, the quick attachable-detachable watch band that reduces charge time for a wearable electronic smart watch 100 is equipped with a single auxiliary smart watch band battery that is embedded within the single auxiliary quick release smart watch band. In some other embodiments, the quick attachable-detachable watch band that reduces charge time for a wearable electronic smart watch 100 is equipped with a plurality of auxiliary smart watch band batteries that are embedded within the single auxiliary quick release smart watch band. In this way, battery power can be quickly obtained by swapping the single auxiliary quick release smart watch band with drained battery power for another single auxiliary quick release smart watch band that has fully charged battery power.

As the descriptions of FIGS. 1-3 demonstrate, the quick attachable-detachable watch band that reduces charge time for the wearable electronic smart watch 100 differs from and improves upon the current state of the art in wearable device battery technology. However, these improvements and differences are not limited to wearable electronic smart watches, but apply more broadly to other wearable electronic devices that have auxiliary components. Thus, all embodiments of the method and apparatus to reduce battery charging time for wearable electronic devices described in this specification differ from current state of the art wearable device battery technology. In particular, the current state of the art does not provide for auxiliary batteries in quickly detachable/attachable auxiliary components. By contrast, the method and apparatus to reduce battery charging time for wearable electronic devices reduces the power and recharging related down time of wearable electronics significantly. Specifically, the time when the batteries are charging for the wearable electronic device is time in which the wearable electronic device is not worn or used in the existing, conventional state of the art. Yet, the method and apparatus to reduce battery charging time for wearable electronic devices of the present disclosure reduces the user's down time to a few seconds by providing the quick release mechanism for auxiliary components and batteries for a variety of smart wearable devices which a user may have. In this way, the method and apparatus to reduce battery charging time for wearable electronic devices minimizes the interruption to the user's life/schedule since the down time is reduced to the few seconds needed to swap out the auxiliary components with embedded batteries.

The next several examples focus on smart glasses as the smart wearable device in which a user may need to swap auxiliary components and batteries to quickly obtain more battery power for the smart wearable device. Specifically, FIG. 4 conceptually illustrates a perspective view of quick attachable-detachable temples of a smart glasses frame that reduce charge time for wearable electronic smart glasses 400. As shown in this figure, the perspective view of quick attachable-detachable temples of a smart glasses frame that reduce charge time for wearable electronic smart glasses 400 includes several components comprising a plurality of auxiliary quick release smart glasses temples 410, a plurality of smart glasses end pieces 420, a plurality of auxiliary smart glasses temple batteries 430, a plurality of default smart glasses embedded batteries 440, and a smart glasses front frame component 450 of the wearable electronic smart glasses 400. The smart glasses front frame component 450 is designed to be the device head which houses the onboard electronics of the wearable electronic smart glasses 400, namely, the plurality of default smart glasses embedded batteries 440. In some embodiments, the plurality of auxiliary quick release smart glasses temples 410 comprises two auxiliary quick release smart glasses temples 410. The two auxiliary quick release smart glasses temples 410 are attachable to and detachable from the device head of the wearable electronic smart glasses 400 at opposing smart glasses end pieces 420 of the smart glasses front frame component 450. In some embodiments, the plurality of auxiliary smart glasses temple batteries 430 comprises two auxiliary smart glasses temple batteries 430. The two auxiliary smart glasses temple batteries 430 are embedded within the two auxiliary quick release smart glasses temples 410, one auxiliary smart glasses temple battery 430 per auxiliary quick release smart glasses temple 410. In some embodiments, the plurality of auxiliary smart glasses temple batteries 430 comprises a first plurality of auxiliary smart glasses temple batteries 430 and a second plurality of auxiliary smart glasses temple batteries 430. In some embodiments, the first plurality of auxiliary smart glasses temple batteries 430 is embedded within a first of the two auxiliary quick release smart glasses temples 410 and the second plurality of auxiliary smart glasses temple batteries 430 is embedded within a second of the two auxiliary quick release smart glasses temples 410.

The plurality of auxiliary quick release smart glasses temples 410 of the wearable electronic smart glasses 400 are designed to be quickly detachable from and attachable to opposing smart glasses end pieces 420 of the smart glasses front frame component 450. It is possible to quickly swap out and replace auxiliary quick release smart glasses temples 410 with fully charged battery power because the plurality of auxiliary smart glasses temple batteries 430 are incorporated into the plurality of auxiliary quick release smart glasses temples 410—one auxiliary smart glasses temple battery 430 in each of the auxiliary quick release smart glasses temples 410. As noted for the single auxiliary smart watch band battery 130 incorporated into the auxiliary quick release smart watch band 110, described above by reference to FIG. 1, the illustration of a single auxiliary smart glasses temple battery 430 in each of the auxiliary quick release smart glasses temples 410 is not intended to be limiting since the single auxiliary smart glasses temple battery 430 may include multiple auxiliary smart glasses temple batteries 430 in each of the auxiliary quick release smart glasses temples 410.

Now, the plurality of default smart glasses embedded batteries 440 proximate to the opposing smart glasses end pieces 420 and embedded within the smart glasses front frame component 450 of the wearable electronic smart glasses 400 are normally charged when a user takes them off and is not using them for some time. However, with the plurality of detachable auxiliary quick release smart glasses temples 410, the user experiences very little down time, merely having to make a quick swap when the plurality of auxiliary smart glasses temple batteries 430 are low or depleted. This swapping action takes significantly less time than conventional method of a user removing the wearable electronic smart glasses 400 and charging the plurality of default smart glasses embedded batteries 440.

Figure 5:
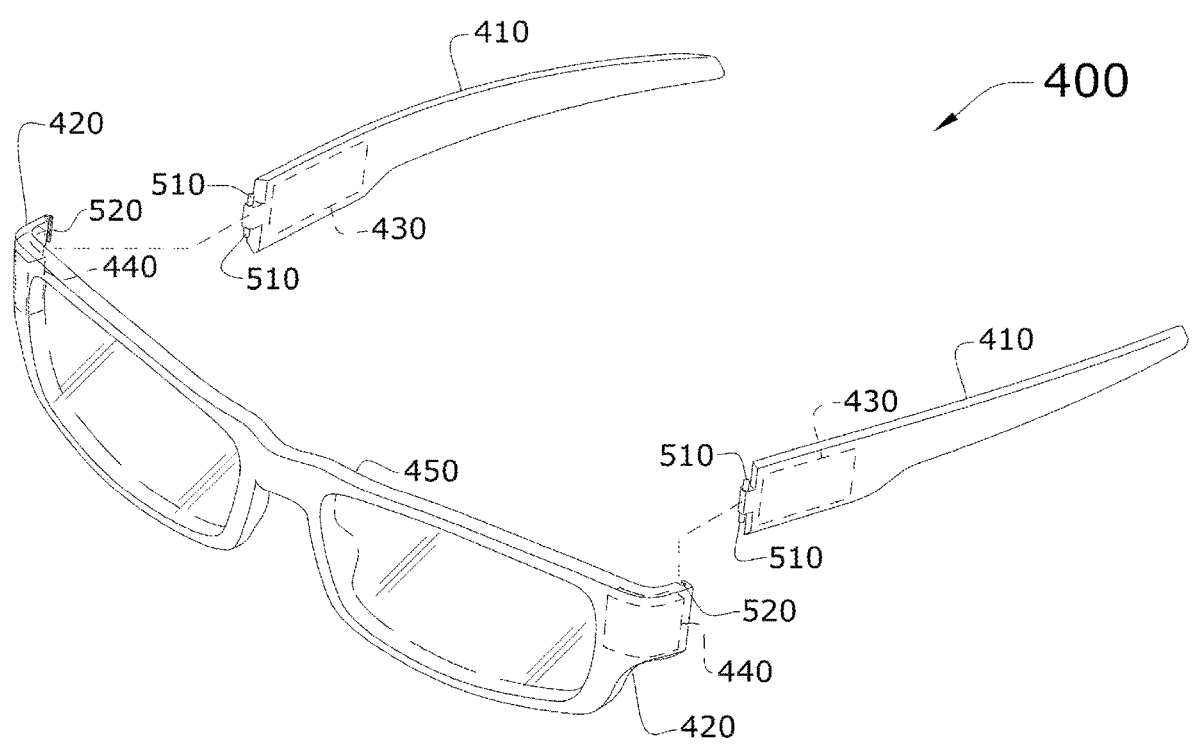
FIG. 5 conceptually illustrates an exploded view of quick attachable-detachable glasses frame temples that reduce charge time for wearable electronic smart glasses in some embodiments.

By way of example, FIG. 5 conceptually illustrates an exploded view of the quick attachable-detachable glasses frame temples that reduce charge time for the wearable electronic smart glasses 400. As shown in this figure, the quick attachable-detachable glasses frame temples that reduce charge time for the wearable electronic smart glasses 400 includes the plurality of auxiliary quick release smart glasses temples 410, the plurality of smart glasses end pieces 420, the plurality of auxiliary smart glasses temple batteries 430, the plurality of default smart glasses embedded batteries 440, and the smart glasses front frame component 450. Additional components of the quick attachable-detachable glasses frame temples that reduce charge time for the wearable electronic smart glasses 400 are also shown in this figure, including a plurality of male connectors 510 and a plurality of female connectors 520.

In this view, the plurality of auxiliary quick release smart glasses temples 410 are detached from the plurality of smart glasses end pieces 420. Also, the plurality of male connectors 510 are included at connecting ends of the auxiliary quick release smart glasses temples 410 while the plurality of female connectors 520 are attached to the smart glasses front frame component 450 at outer edges of the smart glasses end pieces 420. Thus, the plurality of auxiliary quick release smart glasses temples 410 are able to be detached from the plurality of smart glasses end pieces 420 of the smart glasses front frame component 450 by disconnecting the plurality of male connectors 510 from the plurality of female connectors 520. Conversely, when the plurality of male connectors 510 are aligned with the plurality of female connectors 520, the plurality of auxiliary quick release smart glasses temples 410 are able to be attached/re-attached to the plurality of smart glasses end pieces 420 of the smart glasses front frame component 450. This quick release mechanism is described further below, by reference to FIGS. 6 and 7.

Figure 4:
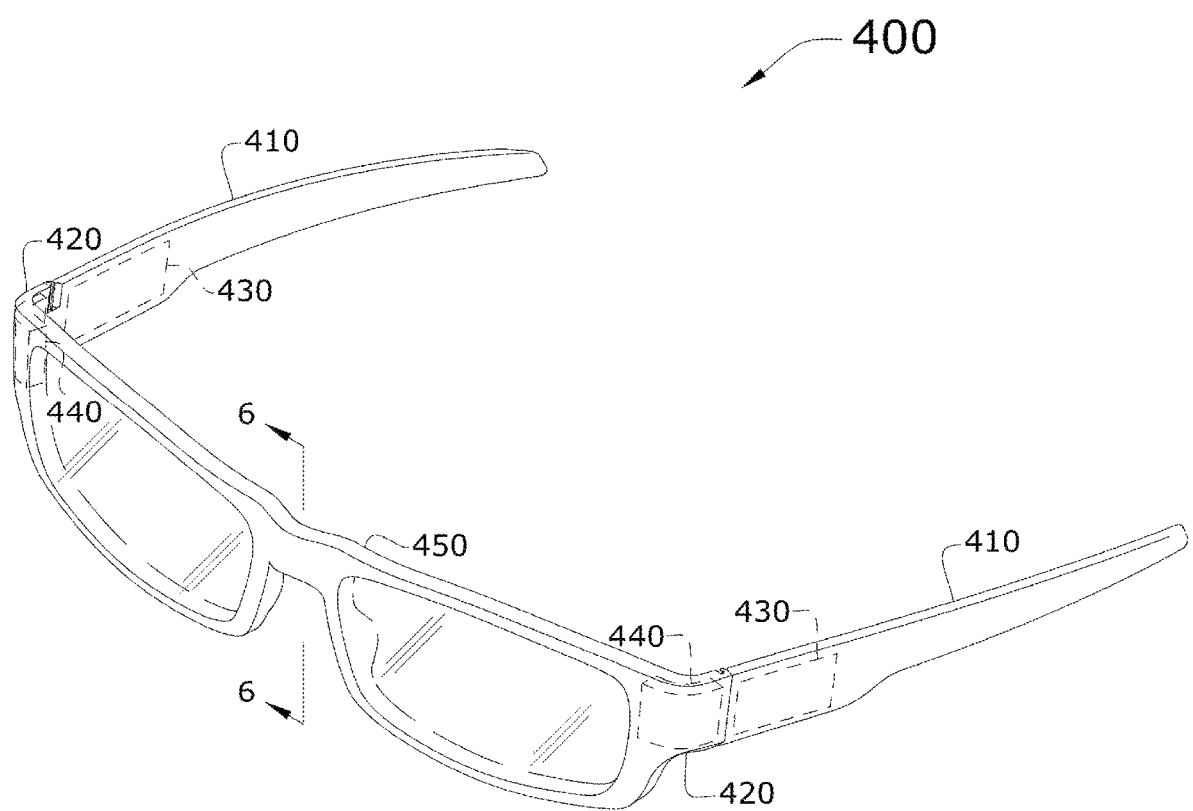
FIG. 4 conceptually illustrates a perspective view of quick attachable-detachable temples of a smart glasses frame that reduce charge time for wearable electronic smart glasses in some embodiments.
Figure 6:
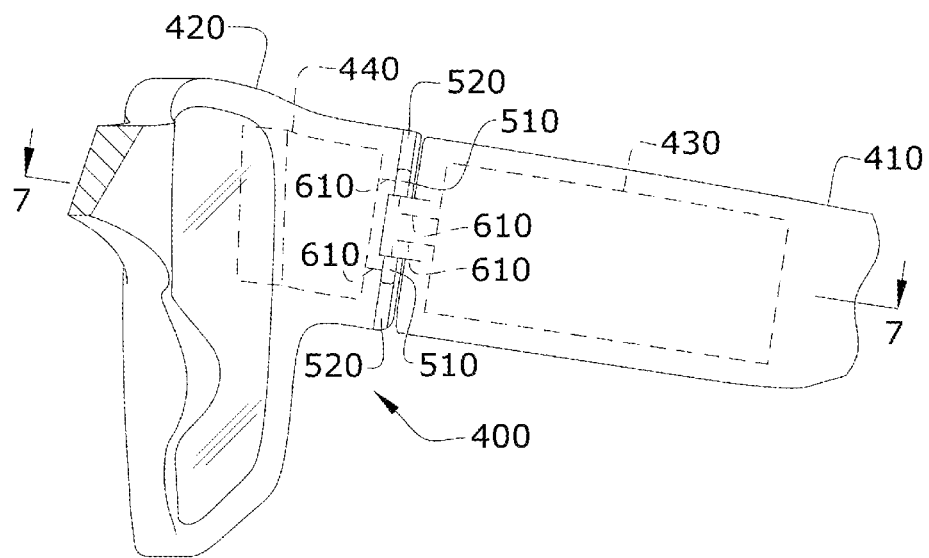
FIG. 6 conceptually illustrates a section view of the quick attachable-detachable glasses frame temples that reduce charge time for the wearable electronic smart glasses shown in FIGS. 4 and 5, with the section view being taken along line 6-6 in FIG. 4.

In particular, FIG. 6 conceptually illustrates a section view of the quick attachable-detachable glasses frame temples that reduce charge time for the wearable electronic smart glasses 400 shown in FIGS. 4 and 5, with the section view being taken along line 6-6 in FIG. 4. As shown in this figure, the quick attachable-detachable glasses frame temples that reduce charge time for the wearable electronic smart glasses 400 includes the plurality of auxiliary quick release smart glasses temples 410, the plurality of smart glasses end pieces 420, the plurality of auxiliary smart glasses temple batteries 430, the plurality of default smart glasses embedded batteries 440, the smart glasses front frame component 450, the plurality of male connectors 510, and the plurality of female connectors 520.

Also shown are composite electro-mechanical connectors 610 that provide current flow from the plurality of auxiliary smart glasses temple batteries 430 to the plurality of default smart glasses embedded batteries 440 when the plurality of male connectors 510 along the connecting ends of the plurality of auxiliary quick release smart glasses temples 410 are connected to the plurality of female connectors 520 at the outer edges of plurality of smart glasses end pieces 420. When the plurality of male connectors 510 are disconnected from the plurality of female connectors 520 and the plurality of auxiliary quick release smart glasses temples 410 are detached from the plurality of smart glasses end pieces 420, the composite electro-mechanical connectors 610 are also disconnected. When the composite electro-mechanical connectors 610 are disconnected, an open power charging end of the disconnected composite electro-mechanical connectors 610 is exposed at the connecting end of the auxiliary quick release smart glasses temples 410. While not shown in this figure, the open power charging end allows for normal charging of the auxiliary smart glasses temple battery 430. However, this does not increase down time in any way since the user would have been able to swap out one set of auxiliary quick release smart glasses temples 410 with depleted auxiliary smart glasses temple batteries 430 for another set of auxiliary quick release smart glasses temples 410 with fully (or partially) charged auxiliary smart glasses temple batteries 430. Then, while not in use, the auxiliary smart glasses temple batteries 430 of the swapped out auxiliary quick release smart glasses temples 410 can be separately and independently set up for charging.

Figure 7:
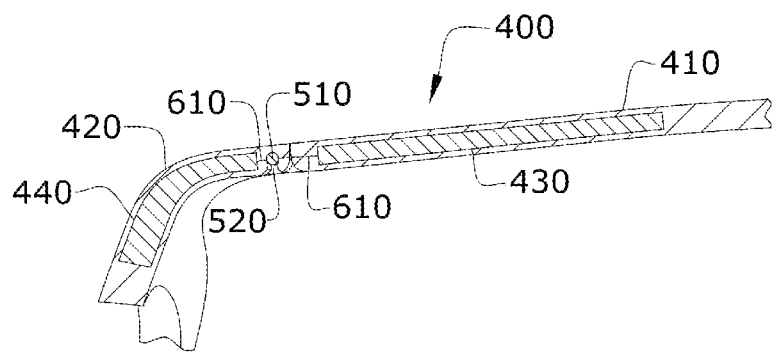
FIG. 7 conceptually illustrates a top section view of the quick attachable-detachable glasses frame temples that reduce charge time for the wearable electronic smart glasses shown in FIGS. 4, 5, and 6, with the top section view taken along line 7-7 in FIG. 6.

From another perspective, FIG. 7 conceptually illustrates a top section view of the quick attachable-detachable glasses frame temples that reduce charge time for the wearable electronic smart glasses 400 shown in FIGS. 4, 5, and 6, with the top section view taken along line 7-7 in FIG. 6. From this perspective, the auxiliary smart glasses temple battery 430 is shown as embedded within the one of the auxiliary quick release smart glasses temples 410 while a default smart glasses embedded battery 440 is shown as embedded within one of the smart glasses end pieces 420 of the wearable electronic smart glasses 400. The composite electro-mechanical connectors 610 are shown in between the auxiliary quick release smart glasses temples 410 and the smart glasses end piece 420, making connections to the plurality of male connectors 510 at the connecting end of the auxiliary quick release smart glasses temples 410 and to the plurality of female connectors 520 at the outer edge of the smart glasses end piece 420.

While the examples described above, by reference to FIGS. 1-7, focus on wearable electronic smart watches and smart glasses, the quick release and connect system that provides battery power for a wearable electronic device and the method for reducing battery charging down time of a wearable electronic device of the present disclosure may apply to numerous other wearable electronic devices that are battery powered and have auxiliary components. Generally, therefore, the quick release and connect system that provides battery power for a wearable electronic device and the method for reducing battery charging down time of a wearable electronic device may be comprised of the following elements, steps, actions, and/or other interactions. This list of possible constituent elements, steps, actions, and/or other interactions is intended to be exemplary only and it is not intended that this list be used to limit the quick release and connect system that provides battery power for a wearable electronic device and the method for reducing battery charging down time of a wearable electronic device of the present application to just these elements, steps, actions, or other interactions. Persons having ordinary skill in the art relevant to the present disclosure may understand there to be equivalent elements, steps, actions, or other interactions that may be substituted within the present disclosure without changing the essential function or operation of the quick release and connect system that provides battery power for a wearable electronic device and the method for reducing battery charging down time of a wearable electronic device.

1. The device head or main element of the wearable electronics, with its rechargeable battery. For example, the main interface component 150 (or device head) and the smart watch case battery 120 of the wearable electronic smart watch 100, described above by reference to FIG. 1, or the smart glasses front frame component 450 and the default smart glasses embedded batteries 440 of the wearable electronic smart glasses 400, described above by reference to FIG. 4. While the main element of any particular wearable electronic device may differ from the main element of other wearable electronic devices (e.g., the device head of a smart watch versus the frame of smart glasses), for purposes of this specification, the main element also referred to as the device head, with particular naming conventions applying for particular embodiments (e.g., the main interface component 150 as the device head for the wearable electronic smart watch 100, described above by reference to FIG. 1, the smart glasses front frame component 450 as the device head of the wearable electronic smart glasses 400, described above by reference to FIG. 4, etc.). Also, a type of battery utilized as the rechargeable battery of the main element (device head) for any particular wearable electronic device may differ from the type of battery employed as the rechargeable battery of other wearable electronic devices and may also differ from the type of batteries used as the auxiliary batteries described throughout the present disclosure and, therefore, are generally referred to as rechargeable battery or batteries, whatever the type, size, style, etc., utilized for any wearable electronic device.

2. Auxiliary quick detach/attach components, with auxiliary batteries. For example, the auxiliary quick release smart watch bands 110 and auxiliary smart watch band batteries 130 of the wearable electronic smart watch 100, described above by reference to FIGS. 1-3, or the auxiliary quick release smart glasses temples 410 and auxiliary smart glasses temple batteries 430 of the wearable electronic smart glasses 400, described above by reference to FIGS. 4-7, with their respective auxiliary batteries embedded within the auxiliary quick detach/attach components of the wearable electronic device or otherwise attached/connected to the auxiliary quick detach/attach components of the wearable electronic device. The number of auxiliary quick detach/attach components varies. In some embodiments, the number auxiliary quick detach/attach components is two quick detach/attach components. For example, two auxiliary quick detach/attach wrist bands of a smart watch, two auxiliary quick detach/attach temples for smart glasses, etc. In some embodiments, the number of auxiliary quick detach/attach components is one single auxiliary quick detach/attach component. For example, one auxiliary quick detach/attach component with auxiliary battery power for a smart bracelet, one auxiliary quick detach/attach component with auxiliary battery power for a smart necklace, or one auxiliary quick detach/attach wrist band for a smart watch (i.e., only one of two wrist bands being an auxiliary quick detach/attach component with auxiliary battery power) or one auxiliary quick detach/attach temples for smart glasses (i.e., only one of two temples being an auxiliary quick detach/attach component with auxiliary battery power).

3. An additional set of auxiliary quick detach/attach components, with their auxiliary batteries. For many wearable electronic devices, a "set" of auxiliary quick detach/attach components implies a pair of auxiliary quick detach/attach components (e.g., a pair of auxiliary quick release smart watch bands, a pair of auxiliary quick release smart glasses temples, etc.). However, the additional set may include a single auxiliary quick detach/attach component, one auxiliary quick detach/attach component out of two or more auxiliary components with which the wearable electronic device is equipped (e.g., one auxiliary quick detach/attach wrist band out of two wrist bands for a smart watch), two auxiliary quick detach/attach components (e.g., a "pair" as noted above), each wearable electronic device having at least one auxiliary embedded within or attached to the auxiliary quick detach/attach component, no matter what number of varied auxiliary quick detach/attach component(s) are incorporated. Therefore, other electronic wearable devices can incorporate more than two auxiliary components and/or batteries. For example, three auxiliary components with three auxiliary batteries, four auxiliary components with four auxiliary batteries, or more, depending on the particular wearable electronic device. Also, a person could have multiple additional sets of the auxiliary quick detach/attach components with auxiliary batteries. When fully charged and upon detaching the presently attached auxiliary quick detach/attach components, the additional set of auxiliary quick detach/attach components with fully charged auxiliary batteries would be available as replacement components to attach to the device head when the battery power is low or depleted for the auxiliary batteries of the presently attached auxiliary quick detach/attach components.

4. Electrical and mechanical connection between the device head (or main element) and the auxiliary quick detach/attach components. When connected, the auxiliary batteries in the auxiliary quick detach/attach components is able to supply charge/power to recharge the rechargeable battery of the device head (or main element) and/or power other electronic components of the device head (e.g., mechanical interfaces, touchscreen display device, electronics, sensors, and microprocessor unit(s), battery interface and controller, etc.). In some embodiments, when an onboard rechargeable battery of the wearable electronic device is not functioning ("non-functioning"), cannot be detected, or otherwise cannot be charged by auxiliary battery power, the auxiliary batteries embedded within or connected to the auxiliary quick detach/attach component(s) is configured to bypass charging of the onboard rechargeable battery and directly provide auxiliary battery power to the electronic components of the wearable electronic device (e.g., mechanical interfaces, touchscreen display device, electronics, sensors, and microprocessor unit(s), battery interface and controller, etc.).

Figure 8:
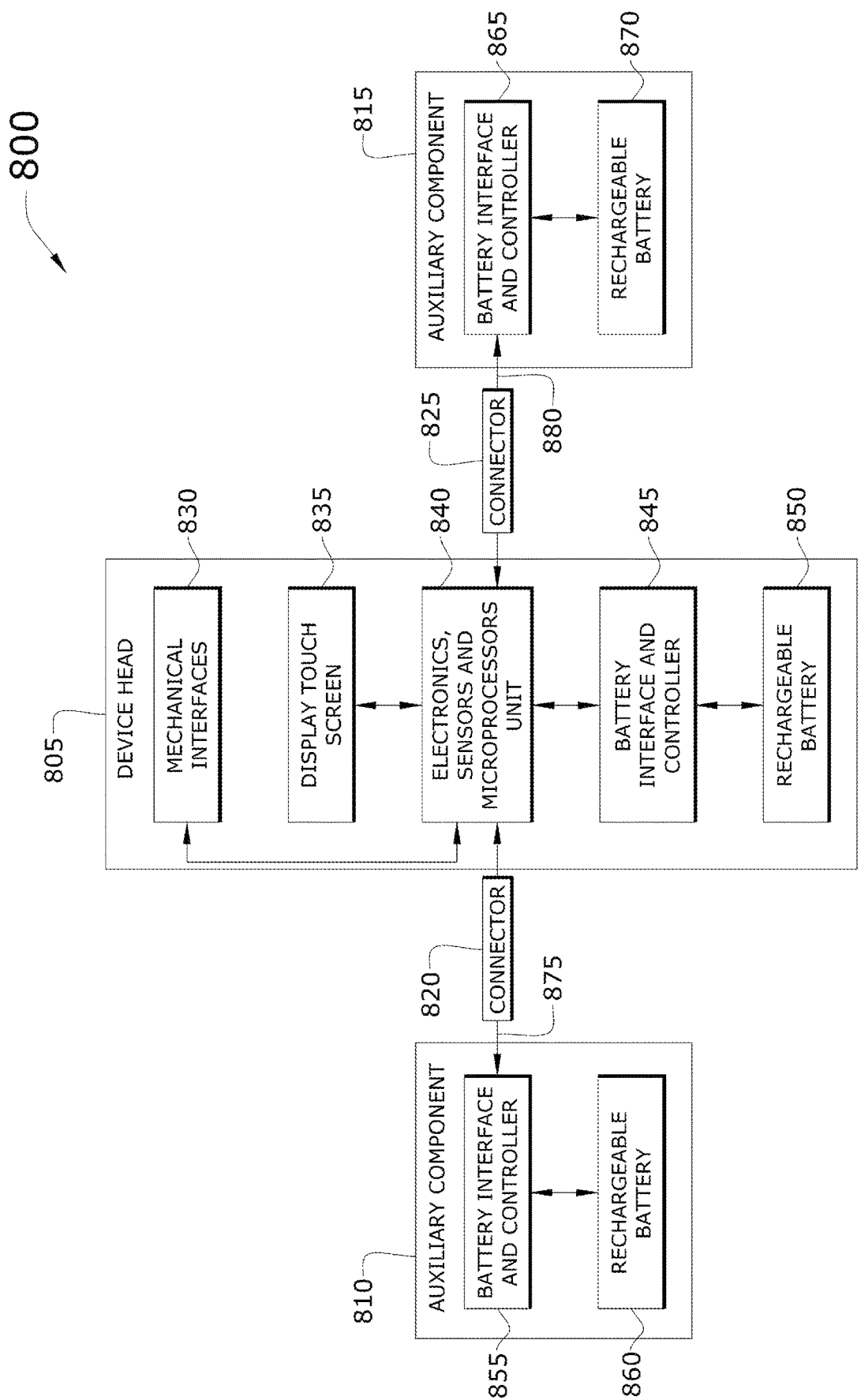
FIG. 8 conceptually illustrates a schematic block diagram of an exemplary method and apparatus where additional rechargeable batteries are embedded in quick attach/detach fastening mechanisms in some embodiments.

By way of example, FIG. 8 conceptually illustrates a schematic block diagram of a quick release and connect system 800 that reduces battery charging down time of a wearable electronic device. As shown in this figure, additional rechargeable auxiliary batteries are embedded in quick attach/detach fastening auxiliary components in connection with a device head of the wearable electronic device 800. Specifically, the quick release and connect system 800 comprises a wearable electronic device head 805, a first wearable electronic device auxiliary component 810, a second wearable electronic device auxiliary component 815, a first electro-mechanical connector 820, and a second electro-mechanical connector 825. In some embodiments, electrical connections 875 and 880 are part of the first electro-mechanical connector 820 and the second electro-mechanical connector 825, respectively. Additionally, the wearable electronic device head 805, the first wearable electronic device auxiliary component 810, and the second wearable electronic device auxiliary component 815 each include several internal or connected components. The several internal or connected components of the wearable electronic device head 805 comprise mechanical interfaces 830, a touchscreen display device 835, an electronics, sensors, and microprocessor(s) unit 840, a battery interface and controller 845, and a rechargeable battery 850. The internal components of the first wearable electronic device auxiliary component 810 comprise a battery interface and controller 855 and a rechargeable battery 860. The internal components of the second wearable electronic device auxiliary component 815 comprise a battery interface and controller 865 and a rechargeable battery 870. While the quick release and connect system 800 relates to embodiments in the wearable electronic device is equipped with two (or "a pair of") auxiliary quick detach/attach components, it is noted here that the quick release and connect system in other embodiments and for other wearable electronic device configurations supports different numbers of auxiliary quick detach/attach components with a variable number of auxiliary batteries. Thus, various embodiments of the quick release and connect system support various configurations of auxiliary quick detach/attach component(s) and/or auxiliary battery/batteries. For example, a single auxiliary quick detach/attach component with one or more auxiliary batteries, one auxiliary quick detach/attach component with one or more auxiliary batteries that is "paired" with another auxiliary quick detach/attach component in which no auxiliary battery is embedded or attached, one auxiliary quick detach/attach component with one or more auxiliary batteries that is accompanied by one or more auxiliary components that are not configured to detach from the device head and do not have auxiliary batteries embedded or attached, three or more auxiliary quick detach/attach component with at least one of the auxiliary quick detach/attach components having at least one auxiliary battery, three or more auxiliary quick detach/attach components with more than one of the auxiliary quick detach/attach components having at least one auxiliary battery embedded or attached, or three or more auxiliary quick detach/attach components in which each of the auxiliary quick detach/attach components has at least one auxiliary battery embedded or attached, etc. Therefore, while the description of this figure pertains to an embodiment of the quick release and connect system 800 that is deployed in a wearable electronic device supporting a pair of auxiliary quick detach/attach components with each auxiliary quick detach/attach component having at least one auxiliary battery, it is noted that the functions and features described herein apply to those other configurations.

In some embodiments, the rechargeable auxiliary batteries are embedded within the wearable electronic device auxiliary components. For example, the auxiliary smart watch band batteries 130 are embedded within the auxiliary quick release smart watch bands 110 of the wearable electronic smart watch 100, described above by reference to FIGS. 1-3. Similarly, the auxiliary smart glasses temple batteries 430 are embedded within the auxiliary quick release smart glasses temples 410 of the wearable electronic smart glasses 400, described above by reference to FIGS. 4-7. Therefore, the rechargeable batteries 860 and 870 shown in FIG. 8 may be embedded within the first and second wearable electronic device auxiliary components 810 and 815, respectively. However, the rechargeable auxiliary batteries of some embodiments are not embedded within the wearable electronic device auxiliary components. In some embodiments, the rechargeable auxiliary batteries are attached to the wearable electronic device auxiliary components. When attached, and not embedded, the rechargeable auxiliary batteries are either flush mounted or connected to the wearable electronic device auxiliary components, or attached to an outer surfaces of the wearable electronic device auxiliary components. Accordingly, the rechargeable batteries 860 and 870 shown in this figure may be attached (not embedded) to the first and second wearable electronic device auxiliary components 810 and 815, respectively. When attached, and not embedded, the rechargeable batteries 860 and 870 may be flush mounted or connected to the first and second wearable electronic device auxiliary components 810 and 815, respectively, or may be attached to the outer surface of the first and second wearable electronic device auxiliary components 810 and 815, respectively.

The wearable electronic device head 805 with rechargeable battery 850 is attached to two quick attach/detach auxiliary components, namely, the first wearable electronic device auxiliary component 810 with rechargeable battery 860 and the second wearable electronic device auxiliary component 815 with rechargeable battery 870. In some embodiments, the auxiliary quick detach/attach components are mechanically attached to the device head and the auxiliary batteries are connected by wired electrical connections. In this figure, the first electro-mechanical connector 820 provides the electrical and mechanical connection between the wearable electronic device head 805 and the first wearable electronic device auxiliary component 810 while the second electro-mechanical connector 825 provides the electrical and mechanical connection between the wearable electronic device head 805 and the second wearable electronic device auxiliary component 815. While descriptions of the quick release and connect system that provides battery power for a wearable electronic device and the method for reducing battery charging down time of a wearable electronic device above refer to an additional set of auxiliary quick detach/attach components with auxiliary batteries, the quick release and connect system 800 in FIG. 8 does not show this separate set of detachable auxiliary quick detach/attach components. Instead, such separate set(s) of detachable auxiliary quick detach/attach components may be stored for later usage or may be undergoing present recharging of the rechargeable auxiliary batteries so that these separate set(s) of detachable auxiliary quick detach/attach components are ready to be swapped in place of the first and second wearable electronic device auxiliary components 810 and 815 when the battery levels (or remaining power) of the rechargeable batteries 860 and 870, respectively is low or depleted. Even when such separate set(s) of detachable auxiliary quick detach/attach components are not available or when the auxiliary batteries of such separate set(s) of detachable auxiliary quick detach/attach components are low or depleted (not fully charged and, therefore, would not be swapped in as replacements), the quick release and connect system 800 demonstrated in FIG. 8 provides a distinct improvement to the current state of the art where the default rechargeable battery of the wearable electronic device is contained only in the device head. In other words, the ability to detach auxiliary components (like the temples of smart glasses or the watch bands of a smart watch) with embedded or attached auxiliary rechargeable batteries and attach fully charged replacements of the same auxiliary components and batteries enables a person to increase their usable battery power and, when battery power is low or depleted, allows replacement to occur with very little down time.

In addition to the rechargeable battery 850, the wearable electronic device head 805 includes the mechanical interfaces 830, the touchscreen display device 835, the electronics, sensors, and microprocessor(s) unit 840 (hereinafter also referred to as the "ESMU" 840), and the battery interface and controller 845 (hereinafter also referred to as the "BIC" 845). The mechanical interfaces 830 include interactive elements that enable a user to interact with the wearable electronic device. Examples of mechanical interfaces 830 include, without limitation, a watch crown, a bezel, push buttons, etc. The touchscreen display device 835 is an input/output device that detects touch gesture input upon its surface (e.g., a user touching the screen with a finger or stylus) and visually outputs information and graphics onto the screen display for viewing).

The mechanical interfaces 830, the touchscreen display device 835, and the ESMU 840 include all the electronic functions, sensors and the computational processing units, in addition to any required memory and communication interfaces (examples including, without limitation, WiFi, Bluetooth, Cellular, or GPS) to communicate with the world external to the wearable electronic device, with the exception the circuitry of the BIC 845 and the rechargeable battery 850. The functions of the BIC 845 could include controlling the rechargeable battery 850 in either the powering mode where it dissipates its stored charge, or recharging mode where it accumulates its stored charge, accepting instructions from the ESMU 840 when it is connected to such ESMU, or converting electrical or electromagnetic energy supplied from charging stations to accumulated charge in its respective rechargeable battery 850, and other such functions.

Additionally, the BICs 855 and 865 that are coupled to the rechargeable batteries 860 and 870, respectively are placed within the first and second wearable electronic device auxiliary components 810 and 815, respectively. Note that the first and second wearable electronic device auxiliary components 810 and 815 could be combined as a single tangible auxiliary component. Examples of the first and second wearable electronic device auxiliary components 810 and 815 being combined to form a single auxiliary component include, without limitation, a bracelet, a necklace, multiple combined pieces or parts, such as those in the form of straps, etc. The first and second wearable electronic device auxiliary components 810 and 815 are connected to the device head 805 by way of the first electro-mechanical connector 820 and the second electro-mechanical connector 825, respectively. In some embodiments, the first and second wearable electronic device auxiliary components 810 and 815 are configured to only connect to opposing sides or ends of the device head 805.

The first electro-mechanical connector 820 and the second electro-mechanical connector 825 perform two important functions. As a first function, the first electro-mechanical connector 820 and the second electro-mechanical connector 825 provide mechanical connections of the first and second wearable electronic device auxiliary components 810 and 815, respectively, to the device head 805. The mechanical aspects of connecting are well understood and implemented. The first and second electro-mechanical connector 820 and 825 are designed to be quick detach/attach connectors. Quick detach/attach connector technology is well known and implemented. As a second function, which is innovative and disclosed herein, the first and second electro-mechanical connector 820 and 825 provide a channel for water resistant or water proof connection of electrical connections 875 and 880, respectively, between the BICs 855 and 865 of the first and second wearable electronic device auxiliary components 810 and 815, respectively, to the ESMU 840 of the device head 805.

In some embodiments, electrical connections 875 and 880 are part of first electro-mechanical connector 820 and the second electro-mechanical connector 825, respectively, and provide the electrical connection between the ESMU 840 in the device head 805 and the BICs 855 and 865 of the first and second wearable electronic device auxiliary components 810 and 815, respectively. Specifically, electrical connection 875 comprises a plurality of electrical traces (or "traces/wires"). In some embodiments, the plurality of electrical traces comprise a positive trace and a ground trace for electrical transmission of power. In some embodiments, the plurality of electrical traces comprise more than two electrical traces including the positive trace, the ground trace, and one or more traces for signaling and communication between the BIC (for each of the BIC 855 and the BIC 865) and the ESMU 840 of the device head 805. Alternatively, known signaling over power techniques can be implemented for transmission of power and signals between each BIC 855 and 865 and the ESMU 840 over just two electrical traces.

Functionally, the quick release and connect system 800 works to minimize down time (or recharge time) to maximize fully functional operational time of a wearable electronic device. In the description of the next figure, the rechargeable battery 850 of the device head 805 is referred to as the main battery of the wearable electronic device and the rechargeable batteries 860 and 870 are referred to as auxiliary batteries. The algorithm to power the electronics in the device head could be shuffled. However, in this example, the method for reducing battery charging down time of a wearable electronic device describes a configuration in which the auxiliary batteries supply power to electronics and after depletion of charge/power of the auxiliary batteries, the main battery takes over. However, in another configuration, the main battery might power charge by default, and as its charge depletes, the main battery itself gets recharged by the auxiliary batteries periodically. Of course, when there are a plurality of auxiliary batteries available, all or some of the plurality of auxiliary batteries could supply charge simultaneously, or the plurality of auxiliary batteries could supply charge sequentially.

Figure 9:
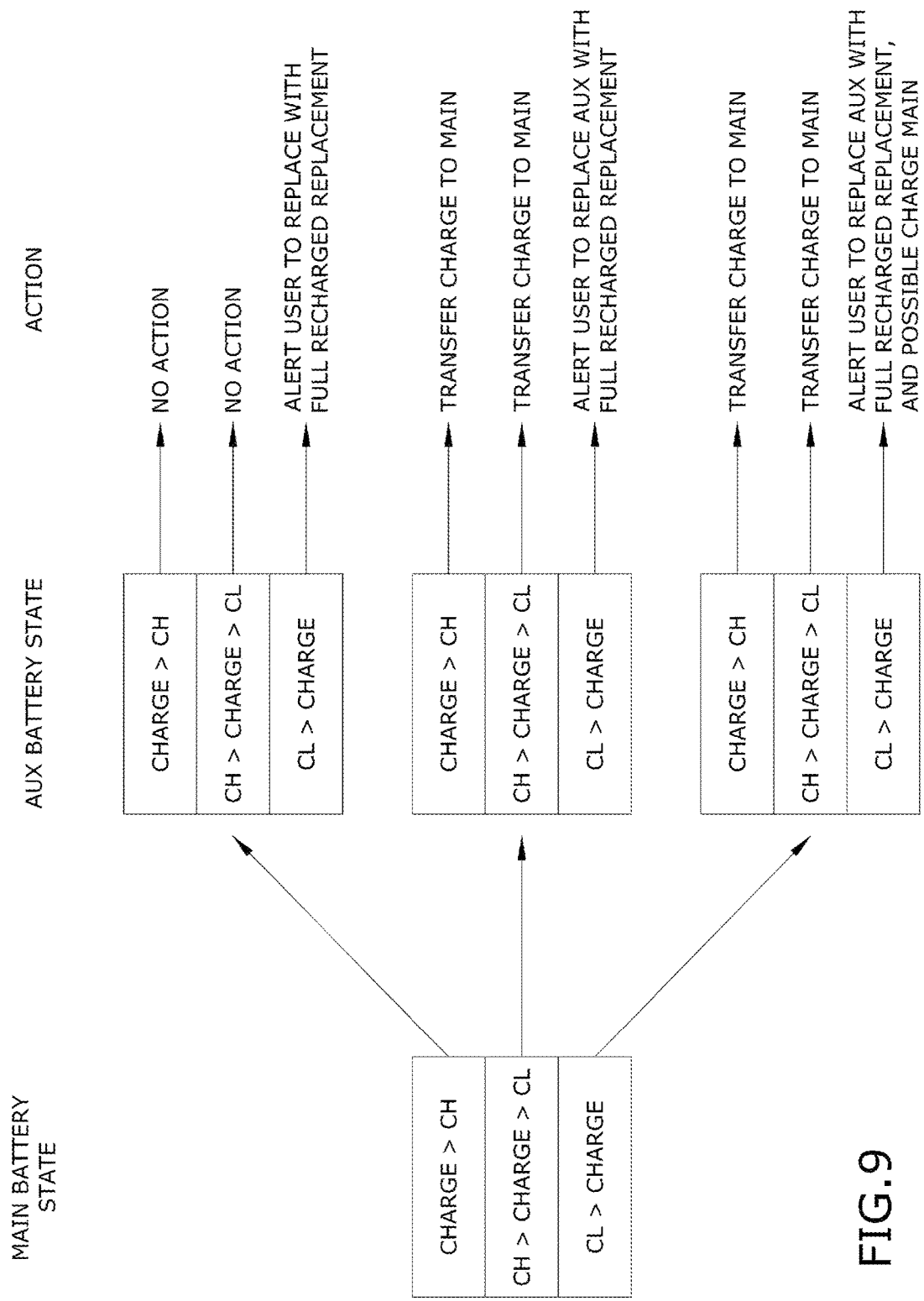
FIG. 9 conceptually illustrates a method for reducing battery charging down time of a wearable electronic device in some embodiments for reducing battery charging down time of a wearable electronic device.

By way of example, FIG. 9 conceptually illustrates a method for reducing battery charging down time of a wearable electronic device 900. In some embodiments, the method for reducing battery charging down time of a wearable electronic device 900 reduces battery charging down time of a wearable electronic device by (i) detecting power level states of the main battery of the wearable electronic device and auxiliary batteries provided in connection with auxiliary components of the wearable electronic device, (ii) providing alert notifications to replace depleted auxiliary batteries with fully charged auxiliary batteries when the detected power level state of the auxiliary batteries is beneath a threshold power level state, and (iii) automatically transferring charge to the main battery from the auxiliary batteries according to the detected power level states.

As shown in this figure, the method for reducing battery charging down time of a wearable electronic device 900 demonstrates actions taken by the ESMU within the device head of the wearable electronic device in relation to the main battery power state and the auxiliary battery power states. Specifically, the battery power states of the main battery and the auxiliary batteries are denoted by "CHARGE" under the corresponding column (i.e., the "CHARGE" denotation under "MAIN BATTERY STATE" shown in FIG. 9 refers to the available power level or remaining charge level of the main battery, while the "CHARGE" denotation under "AUX BATTERY STATE" shown in FIG. 9 refers to the available power level or remaining charge level of the auxiliary batteries). Also, threshold power level states for the main battery and the auxiliary batteries are denoted in this figure as "CH" for "charge high" and "CL" for "charge low". The algorithm is configured to trigger various or no actions (denoted in FIG. 9 as "ACTION"). By way of this convention, when the "CHARGE" level for the main battery state is greater than "CH", the algorithm follows only a particular path related to a limited set of determinations about the auxiliary battery state, and subsequently identifies an appropriate action to take (or not to take any action at all). Also, in some embodiments, the threshold power level states are configurable by programmatically adjusting this in the ESMU within the device head.

As noted above, the method for reducing battery charging down time of a wearable electronic device 900 starts by detecting the present power or charge level state of the main battery of the wearable electronic device ("CHARGE" under "MAIN BATTERY STATE") and, upon detecting the present power/charge level state of the main battery, moves forward to particular steps for detecting the present power or charge level state of the auxiliary batteries provided in connection with auxiliary components of the wearable electronic device ("CHARGE" under "AUX BATTERY STATE").

Specifically, and referring to the flow shown in FIG. 9, when the method for reducing battery charging down time of a wearable electronic device 900 detects the "CHARGE" of the main battery (under "MAIN BATTERY STATE") to be greater than the "CH" (charge high) threshold power level state, the method for reducing battery charging down time of a wearable electronic device 900 proceeds along the upper arrow to determine the power level of the auxiliary batteries and, subsequently, to a particular action to take in connection with the detected power levels. The action the method for reducing battery charging down time of a wearable electronic device 900 takes depends on the detected auxiliary battery state. In particular, when the method for reducing battery charging down time of a wearable electronic device 900 detects the "CHARGE" of the auxiliary batteries (under "AUX BATTERY STATE") to be greater than the "CH" (charge high) threshold power level state, the method for reducing battery charging down time of a wearable electronic device 900 takes no action (under "ACTION"). Similarly, when the method for reducing battery charging down time of a wearable electronic device 900 detects the "CHARGE" of the auxiliary batteries (under "AUX BATTERY STATE") to be less than the "CH" (charge high) threshold power level state, but greater than the "CL" (charge low) threshold power level state, the method for reducing battery charging down time of a wearable electronic device 900 again takes no action (under "ACTION"). However, when the method for reducing battery charging down time of a wearable electronic device 900 detects the "CHARGE" of the auxiliary batteries (under "AUX BATTERY STATE") to be less than the "CL" (charge low) threshold power level state, then method for reducing battery charging down time of a wearable electronic device 900 takes a specific action (under "ACTION") of informing the user that the main battery is sufficiently charged, but alerting the user that the auxiliary batteries are low or depleted and instructing the user to replace the auxiliary quick detach/attach components of the wearable electronic device with other auxiliary quick detach/attach components that have fully charged auxiliary batteries. Alerting the user can occur in any of several ways, such as visually outputting a notification of the alert on a touchscreen display screen of a smart watch or an inner surface of lenses for a smart glasses wearable electronic device, sending an alert notification to a smart phone configured to receive alert notifications in connection with low/depleted batteries of a wearable electronic bracelet or a wearable electronic necklace, etc.

Turning back to the main battery state in the flow shown in FIG. 9, when the method for reducing battery charging down time of a wearable electronic device 900 detects the "CHARGE" of the main battery (under "MAIN BATTERY STATE") to be less than the "CH" (charge high) threshold power level state, but greater than the "CL" (charge low) threshold power level state, the method for reducing battery charging down time of a wearable electronic device 900 proceeds along the middle arrow to determine the power level of the auxiliary batteries (under "AUX BATTERY STATE") and, subsequently, to a particular action (under "ACTION") to take in connection with the detected power levels. In this scenario, when the main battery charge level is not significantly low or depleted, the actions (under "ACTION") that are performed after detection of available power for the auxiliary batteries (under "AUX BATTERY STATE") are different from the actions described above when the main battery had charge level above the highest threshold level ("CH"). Specifically, when the method for reducing battery charging down time of a wearable electronic device 900 detects the "CHARGE" of the auxiliary batteries (under "AUX BATTERY STATE") to be greater than the "CH" (charge high) threshold power level state, the method for reducing battery charging down time of a wearable electronic device 900 automatically triggers the ESMU to transfer charge from the auxiliary batteries to the main battery (under "ACTION"). Similarly, when the method for reducing battery charging down time of a wearable electronic device 900 detects the "CHARGE" of the auxiliary batteries (under "AUX BATTERY STATE") to be less than the "CH" (charge high) threshold power level state, but greater than the "CL" (charge low) threshold power level state, the method for reducing battery charging down time of a wearable electronic device 900 again automatically triggers the ESMU to transfer charge from the auxiliary batteries to the main battery (under "ACTION"). However, when the method for reducing battery charging down time of a wearable electronic device 900 detects the "CHARGE" of the auxiliary batteries (under "AUX BATTERY STATE") to be less than the "CL" (charge low) threshold power level state, then method for reducing battery charging down time of a wearable electronic device 900 takes a specific action (under "ACTION") of alerting the user that the auxiliary batteries are low or depleted and instructing the user to replace the auxiliary quick detach/attach components of the wearable electronic device with other auxiliary quick detach/attach components that have fully charged auxiliary batteries.

Again referring back to the main battery state in the flow shown in FIG. 9, when the method for reducing battery charging down time of a wearable electronic device 900 detects the "CHARGE" of the main battery (under "MAIN BATTERY STATE") to be less than the "CL" (charge low) threshold power level state, the method for reducing battery charging down time of a wearable electronic device 900 proceeds along the lower arrow to determine the power level of the auxiliary batteries (under "AUX BATTERY STATE") and, subsequently, to a particular action (under "ACTION") to take in connection with the detected power levels. In this scenario, when the main battery charge level is depleted, the actions (under "ACTION") that occur after detection of the available charge for the auxiliary batteries is made (under "AUX BATTERY STATE") are different from the actions described above when the main battery had a charge level that was either above the highest threshold level ("CH") or less than the highest threshold level, but higher than the lowest threshold level ("CL"). In this scenario, when the method for reducing battery charging down time of a wearable electronic device 900 detects the "CHARGE" of the auxiliary batteries (under "AUX BATTERY STATE") to be greater than the "CH" (charge high) threshold power level state, the method for reducing battery charging down time of a wearable electronic device 900 automatically triggers the ESMU to transfer charge from the auxiliary batteries to the main battery (under "ACTION"). Similarly, when the method for reducing battery charging down time of a wearable electronic device 900 detects the "CHARGE" of the auxiliary batteries (under "AUX BATTERY STATE") to be less than the "CH" (charge high) threshold power level state, but greater than the "CL" (charge low) threshold power level state, the method for reducing battery charging down time of a wearable electronic device 900 again automatically triggers the ESMU to transfer charge from the auxiliary batteries to the main battery (under "ACTION"). However, when the method for reducing battery charging down time of a wearable electronic device 900 detects the "CHARGE" of the auxiliary batteries (under "AUX BATTERY STATE") to be less than the "CL" (charge low) threshold power level state, then method for reducing battery charging down time of a wearable electronic device 900 takes a specific action (under "ACTION") of alerting the user that the main battery is depleted and the auxiliary batteries are also depleted and instructing the user to at least replace the auxiliary quick detach/attach components of the wearable electronic device with other auxiliary quick detach/attach components that have fully charged auxiliary batteries, and to continue recharging the main battery of the wearable electronic component, until possible, i.e., the auxiliary battery is fully depleted of charge. It should be noted that draining batteries completely out of charge is not optimal for the life of the battery, but in the case of the device running out of all power, it is best to keep the main battery charged as long as possible at the expense of draining the auxiliary batteries.

To make the quick release and connect system that provides battery power for a wearable electronic device and the method for reducing battery charging down time of a wearable electronic device of the present disclosure, a person may start with a wearable electronic device. Many wearable electronic devices include a device head and a default main battery. Starting with this configuration of a wearable electronic device, for example, the person may then integrate batteries in other auxiliary components of the wearable electronic device. For example, integrating auxiliary batteries within wrist straps (bands) of a smart watch wearable electronic device or within the temples of a wearable electronic smart glasses device. The auxiliary batteries may be embedded within the auxiliary components, or as described further below, by reference to FIGS. 10-16, may be attached to surfaces of the auxiliary components. Either way, the person would need to implement electrical and mechanical connectors for the auxiliary components with auxiliary batteries such that the auxiliary components can be quickly detached or attached. Some electrical and mechanical connectors may incorporate spring and push button based fasteners to hold detachable components/elements in place so as to reduce time taken for detaching and attaching, or other fasteners with rubber gaskets or other sealants to make the connection water proof or moisture resistant. Spring and push button-type fasteners are demonstrated in alternative embodiments, described further below by reference to FIGS. 10-16. When the auxiliary components are attached, the electrical and mechanical connectors would need to provide an electrical connection for current flow from the auxiliary batteries to the main battery or other electronics in the device head of the wearable electronic device. For example, electrical connection provided by wires through the electrical and mechanical connectors which allow the auxiliary batteries in auxiliary components to charge the main battery of the wearable electronic device and/or power the electronics in the device head of the wearable electronic device. Also, the algorithm to power the electronics in the device head of the wearable electronic device could be shuffled. While the method for reducing battery charging down time of a wearable electronic device 900 described above, by reference to FIG. 9, presents a specific flow where auxiliary batteries supply power to electronics in the device head of the wearable electronic device and where, after depletion of the battery charge for the auxiliary batteries, triggers the main battery to take over runtime power charging of the wearable electronic device, other algorithmic configurations are possible. For instance, the algorithm can be configured in a way to start with main battery power charge by default, and when the main battery charge level is low or depleted, triggers the auxiliary batteries to recharge the main battery, or to recharge the main battery on a periodic basis. Other configurations are also possible, such as when there are multiple auxiliary batteries deployed, it is possible to concurrently supply charge from the auxiliary batteries. On the other hand, a different scheme can be configured, such that the multiple auxiliary batteries supply charge in sequence.

To use the quick release and connect system that provides battery power for a wearable electronic device and the method for reducing battery charging down time of a wearable electronic device of the present disclosure, a user would wear his or her wearable electronic device with auxiliary components that include auxiliary batteries that are charged. When the user receives a signal or notification that the batteries of the auxiliary components are discharged, low, or otherwise depleted, the user would simply detach the auxiliary components and replace them with auxiliary components that have fully charged auxiliary batteries. Replacing the auxiliary components is simply a matter of detaching the depleted auxiliary components via the quick detach/attach mechanism and then attaching the fully-charged auxiliary replacement components via the same quick detach/attach mechanism. The user then places the depleted auxiliary components for re-charge.

Figure 10:
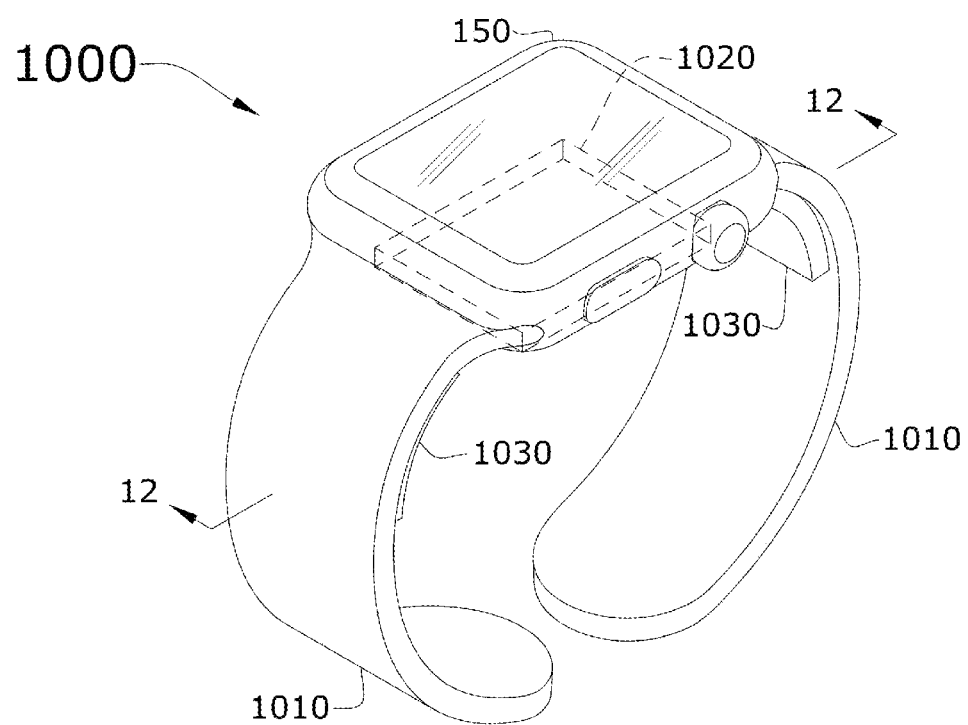
FIG. 10 conceptually illustrates a perspective view of a spring and push button attachable-detachable auxiliary batteries attached to watch bands of a wearable electronic smart watch of an alternative embodiment.

By way of example, FIG. 10 conceptually illustrates a perspective view of a spring and push button attachable-detachable auxiliary batteries attached to watch bands of a wearable electronic smart watch 1000. As shown in this figure, the spring and push button attachable-detachable auxiliary batteries attached to watch bands of a wearable electronic smart watch 1000 includes several components, namely, a main interface component 150 of the wearable electronic smart watch 1000, a plurality of auxiliary quick release smart watch bands 1010, a smart watch case battery 1020, and a plurality of attached auxiliary smart watch band batteries 1030. As shown in this figure, the plurality of attached auxiliary smart watch band batteries 1030 are attached to the plurality of auxiliary quick release smart watch bands 1010 with external exposure (not embedded). However, the plurality of auxiliary quick release smart watch bands 1010 in this alternative embodiment are not configured to be detached from the main interface component 150. Instead, the plurality of attached auxiliary smart watch band batteries 1030 in this alternative embodiment are configured to detach from and attach to the plurality of auxiliary quick release smart watch bands 1010 to provide supplemental, additional, and improved battery charge that results in a user maximizing usage of the functions and features of the wearable electronic smart watch 1000 with very little down time when battery power is low or depleted.

Figure 11:
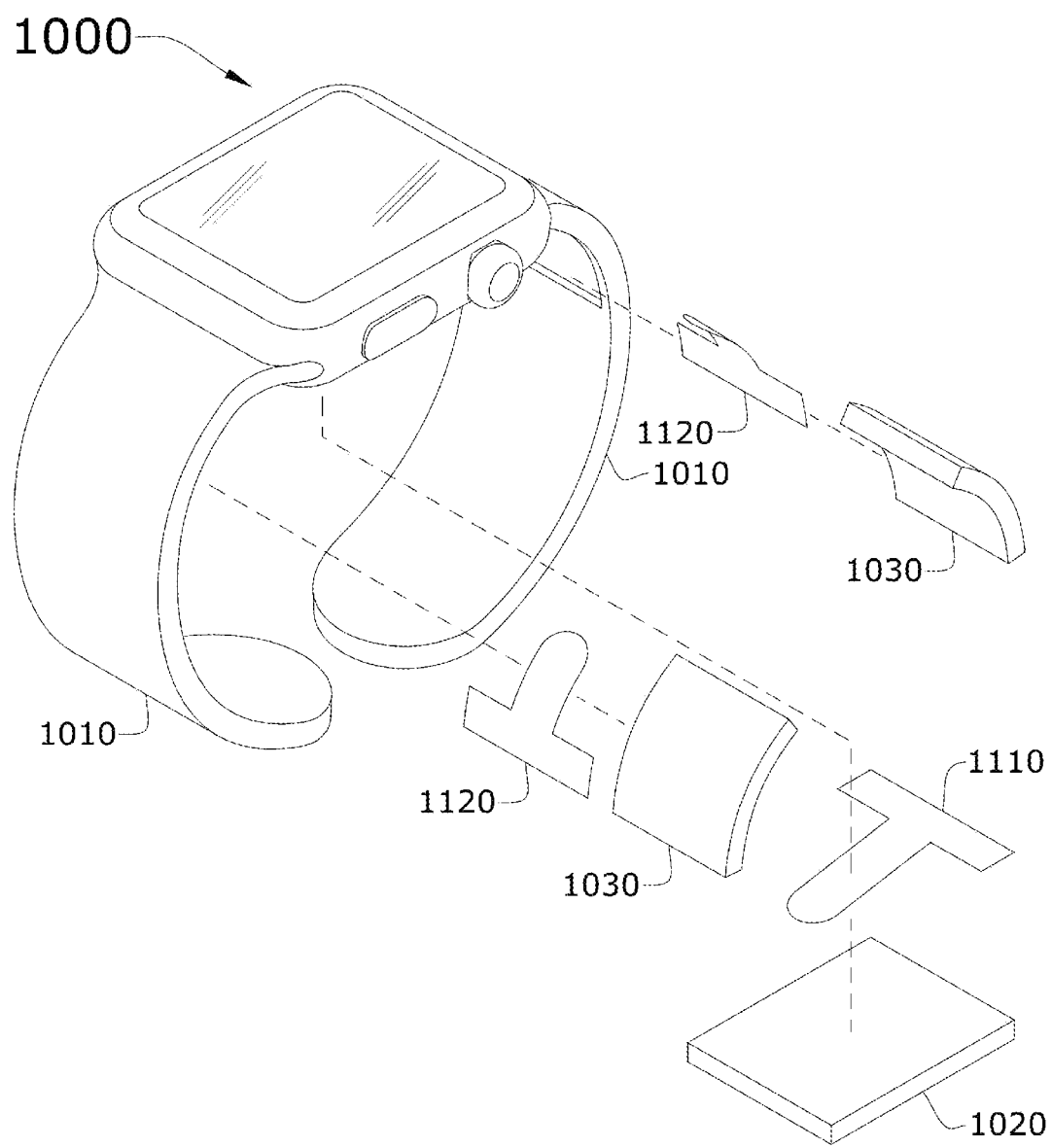
FIG. 11 conceptually illustrates an exploded view of a spring and push button attachable-detachable auxiliary batteries attached to watch bands of a wearable electronic smart watch of an alternative embodiment.

By reference to another view, FIG. 11 conceptually illustrates an exploded view of the spring and push button attachable-detachable auxiliary batteries attached to watch bands of a wearable electronic smart watch 1000. As shown in this figure, the spring and push button attachable-detachable auxiliary batteries attached to watch bands of a wearable electronic smart watch 1000 includes the plurality of auxiliary quick release smart watch bands 1010, the smart watch case battery 1020, and the plurality of attached auxiliary smart watch band batteries 1030. Also, this exploded view of the spring and push button attachable-detachable auxiliary batteries attached to watch bands of a wearable electronic smart watch 1000 reveals additional components, including a smart watch case battery spring 1110 to release the smart watch case battery 1020 and a plurality of attached auxiliary smart watch band battery springs 1120 to release the plurality of attached auxiliary smart watch band batteries 1030.

Figure 12:
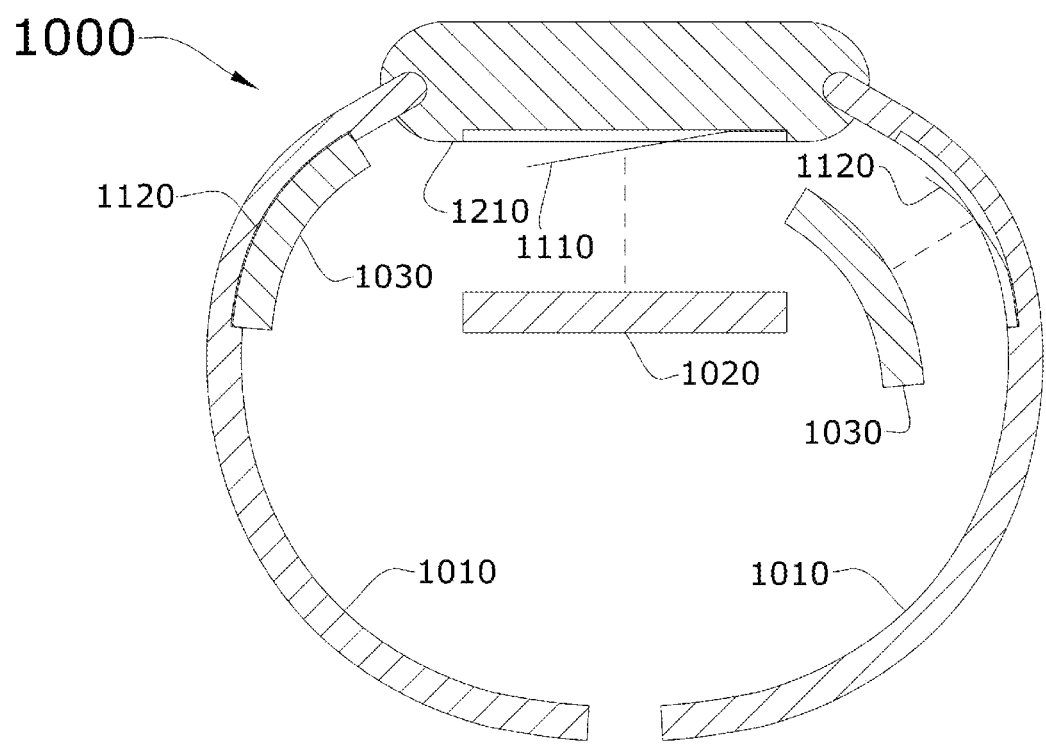
FIG. 12 conceptually illustrates a section view of the spring and push button attachable-detachable auxiliary batteries attached to watch bands of a wearable electronic smart watch shown in FIGS. 10 and 11, with the section view being taken along line 12-12 in FIG. 10.

In another example, FIG. 12 conceptually illustrates a section view of the spring and push button attachable-detachable auxiliary batteries attached to watch bands of a wearable electronic smart watch shown in FIGS. 10 and 11, with the section view being taken along line 12-12 in FIG. 10. As shown here, the spring and push button attachable-detachable auxiliary batteries attached to watch bands of a wearable electronic smart watch 1000 includes the plurality of auxiliary quick release smart watch bands 1010, the smart watch case battery 1020, the plurality of attached auxiliary smart watch band batteries 1030, the smart watch case battery spring 1110 to release the smart watch case battery 1020, and the plurality of attached auxiliary smart watch band battery springs 1120 to release the plurality of attached auxiliary smart watch band batteries 1030. Another component of the spring and push button attachable-detachable auxiliary batteries attached to watch bands of a wearable electronic smart watch 1000 is revealed by this section view, namely, the smart watch back cover 1210, through which the smart watch case battery 1020 is able to be released by activating the smart watch case battery spring 1110. The smart watch case battery spring 1110 can be activated, for example, by pushing the smart watch case batter 1020 into the main interface component 150 and thereby releasing the smart watch case battery spring 1110. Also, the smart watch case battery 1020 can be re-attached within the main interface component 150 of the wearable electronic smart watch

1000 by push force applied to the smart watch case battery 1020 against the smart watch case battery spring 1110. Similarly, the plurality of attached auxiliary smart watch band battery springs 1120 are configured to release the plurality of attached auxiliary smart watch band batteries 1030 when inward force is applied to the attached auxiliary smart watch band batteries 1030 against the plurality of attached auxiliary smart watch band battery springs 1120. This causes the attached auxiliary smart watch band battery springs 1120 to release the attached auxiliary smart watch band batteries 1030, as shown by one of the attached auxiliary smart watch band battery springs 1120 exposed externally with its auxiliary smart watch band battery 1030 shown as detached from the corresponding auxiliary quick release smart watch band 1010. As such, the released auxiliary smart watch band battery 1030 can be charged externally and a replacement auxiliary smart watch band battery 1030 that is fully charged can be attached to the corresponding auxiliary quick release smart watch band 1010 by applying the inward force to the replacement (fully-charged) auxiliary smart watch band battery 1030 against the corresponding attached auxiliary smart watch band battery spring 1120, thereby securing the connection of the replacement (fully-charged) auxiliary smart watch band battery 1030 to the corresponding auxiliary quick release smart watch band 1010.

Figure 13:
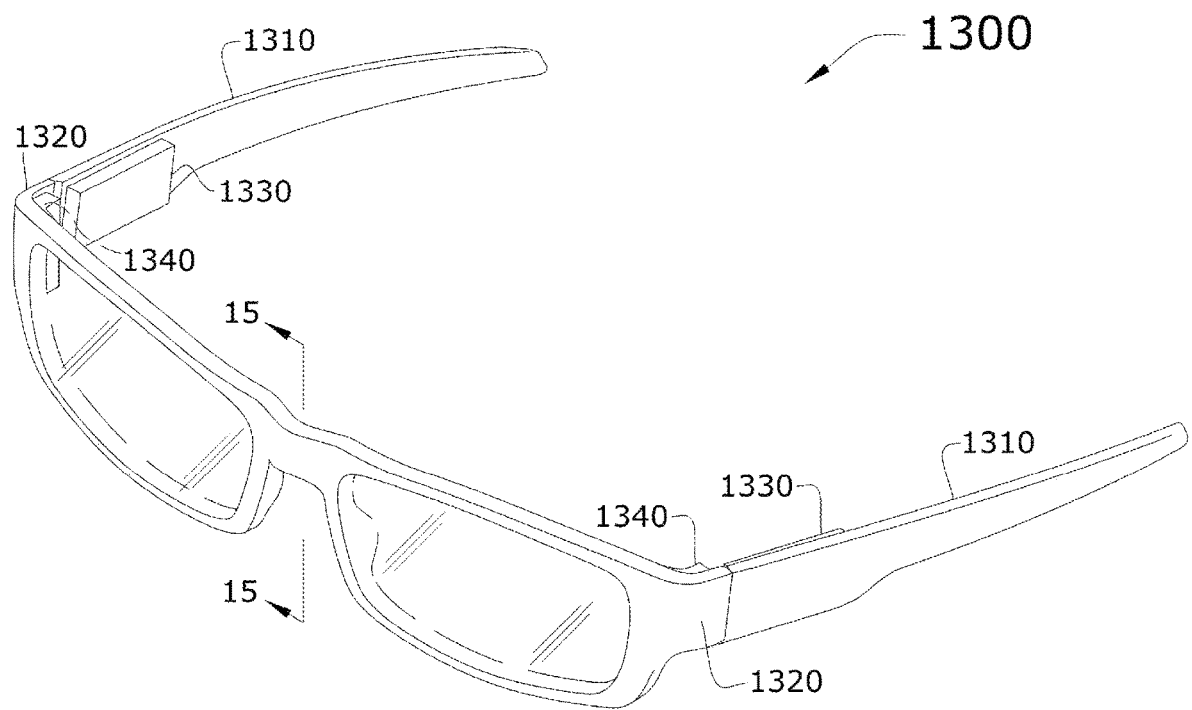
FIG. 13 conceptually illustrates a perspective view of spring and push button attachable-detachable auxiliary batteries attached to temples of wearable electronic smart glasses of an alternative embodiment.

Now turning to a different alternative embodiment, FIG. 13 conceptually illustrates a perspective view of spring and push button attachable-detachable auxiliary batteries attached to temples of wearable electronic smart glasses 1300. As shown in this figure, the perspective view of spring and push button attachable-detachable auxiliary batteries attached to temples of wearable electronic smart glasses 1300 includes several components, namely, a pair of temples 1310, a pair of smart glasses end pieces 1320, a pair of attached auxiliary smart glasses temple batteries 1330, and onboard smart glasses batteries 1340. Here, the pair of temples 1310 are not necessarily detachable and the attached auxiliary smart glasses temple batteries 1330 are externally exposed (not embedded within the temples 1310). However, the attached auxiliary smart glasses temple batteries 1330 are detachable and re-attachable in a way that allows a user to quickly swap out low or depleted attached auxiliary smart glasses temple batteries 1330 with replacement attached auxiliary smart glasses temple batteries 1330 that are fully charged. This is possible when the onboard smart glasses batteries 1340 are fully charged, partially charged, low on charge, or entirely depleted of charge. Thus, by providing a mechanism for a user of wearable electronic smart glasses to quickly swap out auxiliary batteries, the user can charge the low or depleted auxiliary smart glasses temple batteries 1330 after detachment while enjoying the beneficial functions of the wearable electronic smart glasses with fully charged replacement auxiliary smart glasses temple batteries 1330 that attached to the temples 1310 in an amount of down time that is kept to a bare minimum.

Figure 14:
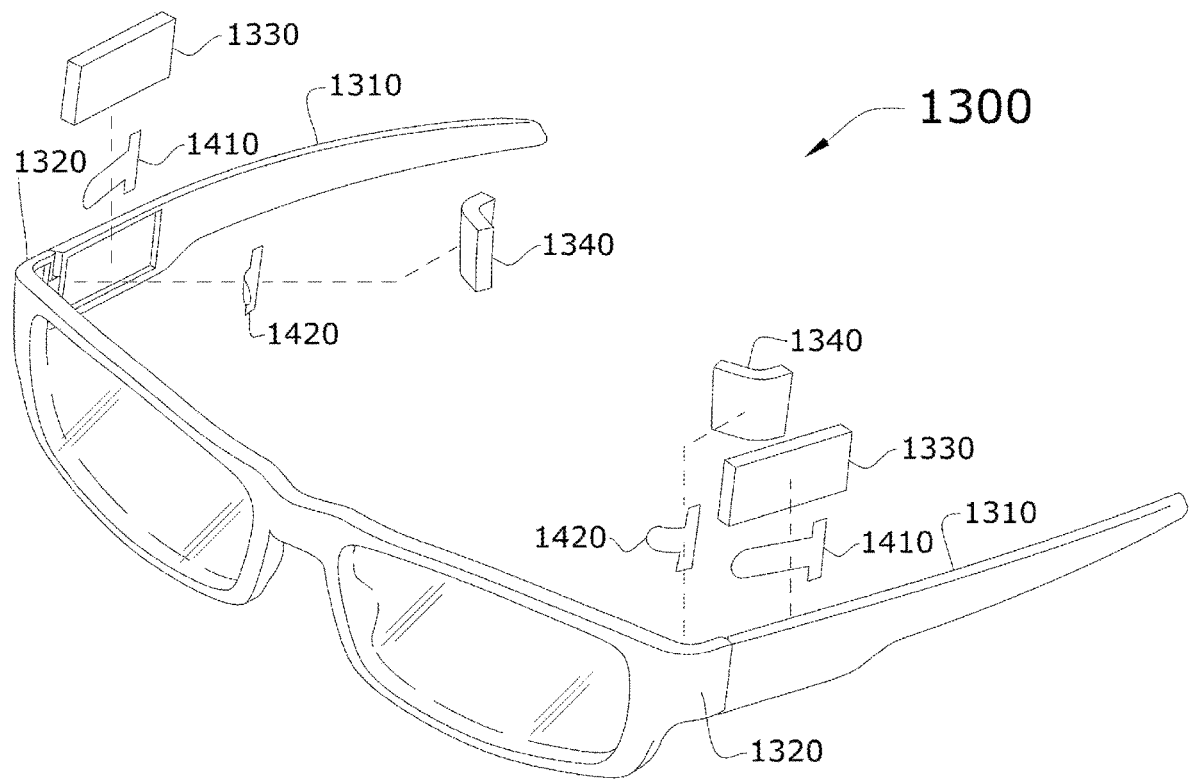
FIG. 14 conceptually illustrates an exploded view of spring and push button attachable-detachable auxiliary batteries attached to temples of wearable electronic smart glasses of an alternative embodiment.

Turning to FIG. 14, an exploded view of spring and push button attachable-detachable auxiliary batteries attached to temples of wearable electronic smart glasses 1300 is conceptually illustrated. As shown, the spring and push button attachable-detachable auxiliary batteries attached to temples of wearable electronic smart glasses 1300 includes the pair of temples 1310, the pair of smart glasses end pieces 1320, the pair of attached auxiliary smart glasses temple batteries 1330, the onboard smart glasses batteries 1340, a pair of attached auxiliary smart glasses temple battery springs 1410 to release the pair of attached auxiliary smart glasses temple batteries 1330, and a pair of onboard smart glasses battery springs 1420 to release the onboard smart glasses batteries 1340. As before, the attached auxiliary smart glasses temple batteries 1330 can be released and/or attached to the temples 1310 of the wearable electronic smart glasses. The temples 1310 are shown with an indentation in this figure. In some embodiments, the indentation is sufficient to fit one of the attached auxiliary smart glasses temple battery springs 1410, with the corresponding attached auxiliary smart glasses temple battery 1330 being attached with external exposure. In some embodiments, the indentation is sufficient to fit one of the attached auxiliary smart glasses temple battery springs 1410 and the corresponding attached auxiliary smart glasses temple battery 1330 which is then attached in a flush mounted manner (i.e., only externally exposing a top surface of the corresponding attached auxiliary smart glasses temple battery 1330).

Further detailed views are described by reference to FIGS. 15 and 16, below. Specifically, FIG. 15 conceptually illustrates a section view of the spring and push button attachable-detachable auxiliary batteries attached to temples of wearable electronic smart glasses 1300 shown in FIGS. 13 and 14, with the section view being taken along line 15-15 in FIG. 13. This figure demonstrates the relative placement of the attached auxiliary smart glasses temple battery 1330 along the temples 1310 and its positional relationship to the onboard smart glasses battery 1340 placed at the edge of the smart glasses end piece 1320. This proximate positioning ensures that electro-mechanical connectors can be integrated to enable charging from the attached auxiliary smart glasses temple battery 1330 to the onboard smart glasses battery 1340 and/or to other electronic components of the wearable electronic smart glasses 1300.

Figure 15:
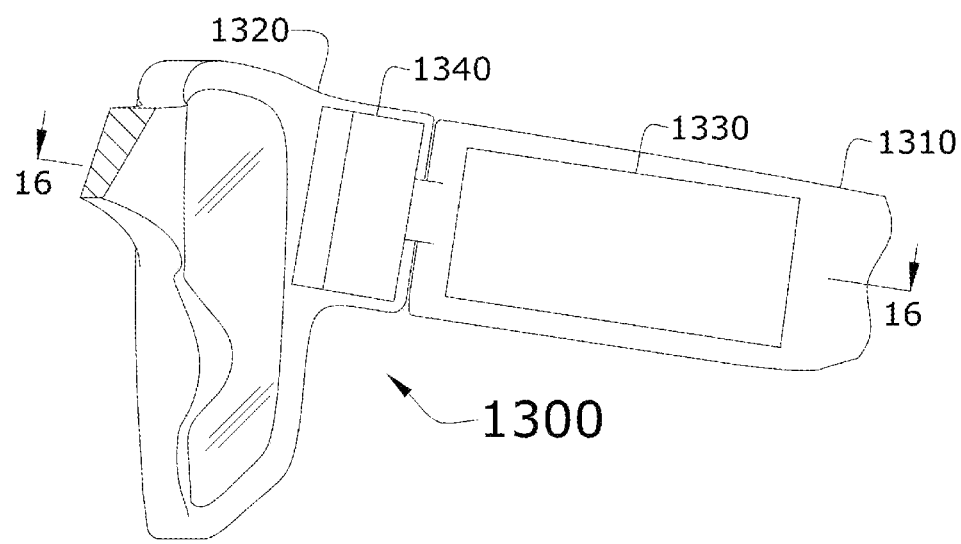
FIG. 15 conceptually illustrates a section view of the spring and push button attachable-detachable auxiliary batteries attached to temples of wearable electronic smart glasses shown in FIGS. 13 and 14, with the section view being taken along line 15-15 in FIG. 13.
Figure 16:
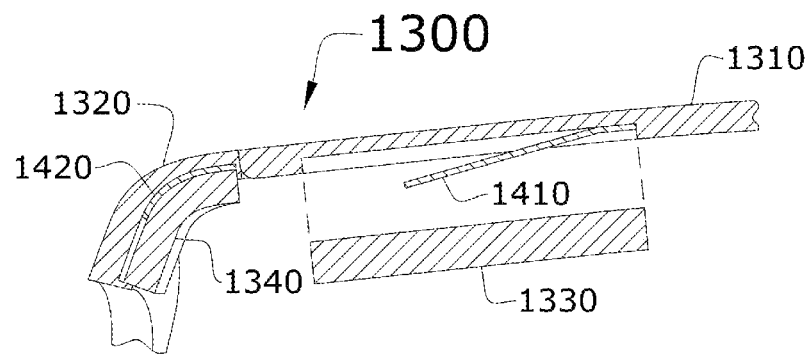
FIG. 16 conceptually illustrates a top section view of the spring and push button attachable-detachable auxiliary batteries attached to temples of wearable electronic smart glasses shown in FIGS. 13, 14, and 15, with the top section view taken along line 16-16 in FIG. 15.

In FIG. 16, a top section view is conceptually illustrated of the spring and push button attachable-detachable auxiliary batteries attached to temples of wearable electronic smart glasses shown in FIGS. 13, 14, and 15, with the top section view taken along line 16-16 in FIG. 15. As shown in this top view, the attached auxiliary smart glasses temple battery 1330 is detached from the temples 1310 by activation of the corresponding attached auxiliary smart glasses temple battery spring 1410. By contrast, the onboard smart glasses battery 1340 is securely attached to the smart glasses end piece 1320 with the corresponding onboard smart glasses battery spring 1420 being pushed into its potential state.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A quick release and connect system that provides battery power for a wearable electronic device and reduces battery charging down time of the wearable electronic device, said quick release and connect system comprising:
   a device head of a wearable electronic device that is configured to provide electronic functions, said device head comprising device hardware and a processing component that is configured to carry out the electronic functions on the wearable electronic device;

an onboard rechargeable battery embedded within the device head of the wearable electronic device;
a plurality of auxiliary components that attach to and detach from the device head of the wearable electronic device;
an auxiliary battery that is embedded within a particular auxiliary component in the plurality of auxiliary components; and
a plurality of quick release mechanical connectors that mechanically connect the plurality of auxiliary components to the device head of the wearable electronic device and provide a quick release mechanism that detaches the plurality of auxiliary components from the device head, wherein the plurality of quick release mechanical connectors comprises a quick release electro-mechanical connector that provides a wired electric channel between the auxiliary battery embedded within the particular auxiliary component and the device head of the wearable electronic device, wherein electric current flows through the wired electric channel from the auxiliary battery embedded within the particular auxiliary component to at least one of (i) the onboard rechargeable battery embedded within the device head and (ii) the device hardware and the processing component that is configured to carry out the electronic functions on the wearable electronic device;
wherein the device head comprises (i) a battery interface and controller (BIC) that detects charge levels of the onboard rechargeable battery and the auxiliary battery and (ii) an electronics, sensors, and microprocessor unit (ESMU) that triggers automatic battery-related actions based on the charge levels of the onboard rechargeable battery and the auxiliary battery;
wherein the auxiliary battery is a first auxiliary battery of a plurality of auxiliary batteries, wherein a second auxiliary battery of the plurality of auxiliary batteries is embedded within a second auxiliary component of the plurality of auxiliary components that attach to and detach from the device head of the wearable electronic device, wherein the second auxiliary component is different from the particular auxiliary component, wherein the quick release electro-mechanical connector is a first quick release electro-mechanical connector, wherein the plurality of quick release mechanical connectors further comprises a second quick release electro-mechanical connector that provides a second wired electric channel between the second auxiliary battery embedded within the second auxiliary component and the device head of the wearable electronic device, wherein electric current flows through the second wired electric channel from the second auxiliary battery embedded within the second auxiliary component to at least one of (i) the onboard rechargeable battery embedded within the device head and (ii) the device hardware and processing component that is configured to carry out the electronic functions on the wearable electronic device.

2. The quick release and connect system of claim 1, wherein the BIC concurrently detects charge levels of the onboard rechargeable battery and the plurality of auxiliary batteries, wherein the ESMU triggers automatic battery-related actions based on the concurrently detected charge levels of the onboard rechargeable battery and the plurality of auxiliary batteries embedded within the plurality of auxiliary components.

3. The quick release and connect system of claim 2, wherein the battery-related actions comprise transferring electric charge from at least one auxiliary battery to the onboard rechargeable battery when the BIC detects less than a threshold low charge level for the onboard rechargeable battery.

4. The quick release and connect system of claim 1, wherein the wearable electronic device comprises a wearable electronic smart watch, wherein the device head comprises a main interface component with a touchscreen display device and a plurality of mechanical interface components, wherein the plurality of auxiliary components comprises a plurality of detachable wrist bands that correspond to the plurality of quick release mechanical connectors, wherein each quick release mechanical connector is configured to mechanically release the corresponding detachable wrist band from the main interface component and securely attach the corresponding detachable wrist band when connecting to the main interface component.

5. The quick release and connect system of claim 1, wherein the wearable electronic device comprises wearable electronic smart glasses, wherein the plurality of auxiliary components comprise a pair of detachable temples.

6. The quick release and connect system of claim 5, said plurality of detachable wrist bands contain rechargeable auxiliary batteries embedded within.

7. The quick release and connect system of claim 1, wherein the device hardware and the processing component are configured to draw power from the electric current that flows through the wired electric channel from the auxiliary battery embedded within the particular auxiliary component when the onboard rechargeable battery is non-functional.

8. The quick release and connect system of claim 1, where (i) said plurality of auxiliary components is one or more auxiliary components (ii) said auxiliary battery is an auxiliary rechargeable battery.

9. The quick release and connect system of claim 1, where (i) the said BIC is a functional component that detects charge levels of the onboard rechargeable battery and the auxiliary battery and (ii) said ESMU is a functional component that triggers automatic battery-related actions based on the charge levels of the onboard rechargeable battery and the auxiliary battery.

10. The quick release and connect system of claim 1, wherein the wearable electronic device comprises a plurality of electronic components that provide all electronic functions of the wearable electronic device, wherein the plurality of electronic components that provide all electronic functions of the wearable electronic device are powered by the one or more of the auxiliary batteries.

* * * * *